United States Patent
Tano et al.

(10) Patent No.: US 12,140,993 B2
(45) Date of Patent: Nov. 12, 2024

(54) COMMUNICATION SYSTEM, COMMUNICATION DEVICE, COMMUNICATION METHOD, CONTROL CIRCUIT, AND STORAGE MEDIUM

(71) Applicant: Mitsubishi Electric Corporation, Tokyo (JP)

(72) Inventors: Fumihiko Tano, Tokyo (JP); Jun Mizuguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 41 days.

(21) Appl. No.: 18/136,935

(22) Filed: Apr. 20, 2023

(65) Prior Publication Data

US 2023/0259157 A1 Aug. 17, 2023

Related U.S. Application Data

(63) Continuation of application No. PCT/JP2020/048041, filed on Dec. 22, 2020.

(51) Int. Cl.
*G06F 1/12* (2006.01)
*G06F 1/14* (2006.01)
(Continued)

(52) U.S. Cl.
CPC . *G06F 1/12* (2013.01); *G06F 1/14* (2013.01)

(58) Field of Classification Search
CPC ............... G06F 1/12; G06F 1/14; H04L 7/00
See application file for complete search history.

(56) References Cited

U.S. PATENT DOCUMENTS

| 9,413,625 B2 | 8/2016 | Le Pallec et al. |
| 10,567,101 B2 | 2/2020 | Ruffini et al. |

(Continued)

FOREIGN PATENT DOCUMENTS

| JP | 5779664 B2 | 9/2015 |
| JP | 2017-534210 A | 11/2017 |

(Continued)

OTHER PUBLICATIONS

IEEE Std. 1588-2008, "IEEE Standard for a Precision Clock Synchronization Protocol for Networked Measurement and Control Systems", IEEE Instrumentation and Measurement Society, Jul. 24, 2008, 289 pages.

(Continued)

*Primary Examiner* — Xuxing Chen
(74) *Attorney, Agent, or Firm* — Birch, Stewart, Kolasch & Birch, LLP

(57) ABSTRACT

A communication system includes a master device, a slave device, and a relay device. The relay device includes a time synchronization management unit that stores retention time of a first time-synchronization frame sent from the master device, adds the first-time-synchronization-frame retention time to a correction field when a second time-synchronization frame sent from the master device is relayed, stores retention time of a third time-synchronization frame sent from the slave device, and adds the third-time-synchronization-frame retention time to a correction field when a fourth time-synchronization frame sent from the master device is relayed. The slave device includes a transmission delay time aggregation unit storing a value in the correction field of the second time-synchronization frame and characteristic information about priority in a frame in association with each other, and storing a value in the correction field of the fourth (Continued)

time-synchronization frame and the characteristic information in association with each other.

20 Claims, 16 Drawing Sheets

(51) Int. Cl.
*G06F 13/42* (2006.01)
*H04L 5/00* (2006.01)
*H04L 7/00* (2006.01)

(56) References Cited

U.S. PATENT DOCUMENTS

| | | | |
|---|---|---|---|
| 11,191,052 B2* | 11/2021 | Moon | H04W 88/023 |
| 11,201,685 B2 | 12/2021 | Yamasaki | |
| 11,444,713 B2 | 9/2022 | Ruffini et al. | |
| 2016/0261517 A1* | 9/2016 | Kohiga | H04L 47/6275 |
| 2017/0150464 A1* | 5/2017 | Kazehaya | H04L 12/422 |
| 2017/0324497 A1 | 11/2017 | Ruffini et al. | |
| 2020/0021378 A1* | 1/2020 | Aweya | H04J 3/0673 |
| 2021/0099341 A1* | 4/2021 | Moon | H04L 41/0806 |
| 2023/0388097 A1* | 11/2023 | Yamada | H04L 12/28 |

FOREIGN PATENT DOCUMENTS

| | | |
|---|---|---|
| JP | 2020-129778 A | 8/2020 |
| WO | WO2012/104326 A1 | 8/2012 |

OTHER PUBLICATIONS

IEEE Std.802.1AS-2020, "IEEE Standard for Local and Metropolitan Area Networks—Timing and Synchronization for Time-Sensitive Applications", IEEE Computer Society, Jun. 19, 2020, pp. 1-421.

Japanese Notification of Reason for Refusal dated Sep. 7, 2021 in Japanese Patent Application No. 2021-530254.

German Office Action for German Application No. 11 2020 007 723.3, dated Jan. 10, 2024, with English translation.

* cited by examiner

FIG.3
(a) PTP over IPv4/v6 UDP (INCLUDING VLAN TAG)
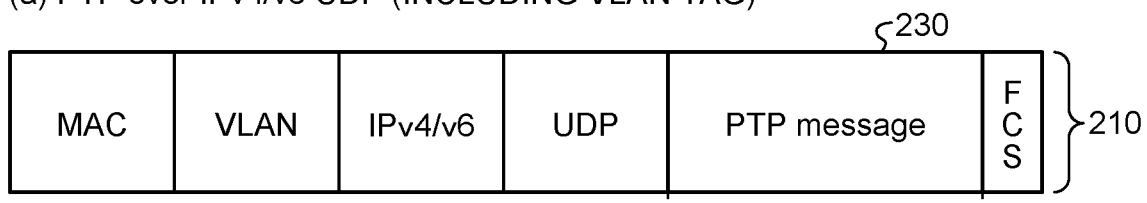
(b) PTP over IEEE802.3/Ethernet (INCLUDING VLAN TAG)
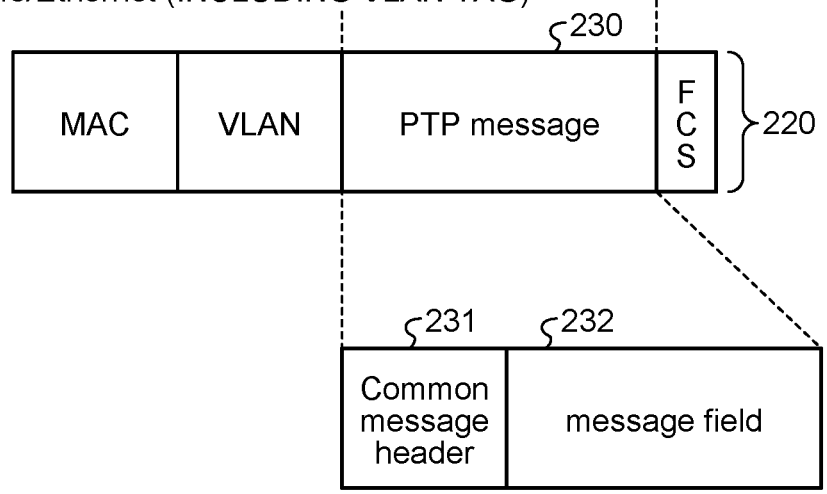

FIG.4

| Bits | | | | | | | | Octets | Offset | |
|---|---|---|---|---|---|---|---|---|---|---|
| 7 | 6 | 5 | 4 | 3 | 2 | 1 | 0 | | | |
| transportSpecific | | | | messageType | | | | 1 | 0 | |
| reserved | | | | versionPTP | | | | 1 | 1 | |
| messageLength | | | | | | | | 2 | 2 | |
| domainNumber | | | | | | | | 1 | 4 | |
| reserved | | | | | | | | 1 | 5 | |
| flagField | | | | | | | | 2 | 6 | |
| correctionField | | | | | | | | 8 | 8 | ~2311 |
| reserved | | | | | | | | 4 | 16 | |
| sourcePortIdentity | | | | | | | | 10 | 20 | |
| sequenceId | | | | | | | | 2 | 30 | |
| controlField | | | | | | | | 1 | 32 | |
| logMessageInterval | | | | | | | | 1 | 33 | |

231

COMMUNICATION SYSTEM, COMMUNICATION DEVICE, COMMUNICATION METHOD, CONTROL CIRCUIT, AND STORAGE MEDIUM

CROSS-REFERENCE TO RELATED APPLICATION

This application is a continuation application of International Application PCT/JP2020/048041, filed on Dec. 22, 2020, and designating the U.S., the entire contents of which are incorporated herein by reference.

BACKGROUND OF THE INVENTION

1. Field of the Invention

The present disclosure relates to a communication system, a communication device, a communication method, a control circuit, and a storage medium.

2. Description of the Related Art

A factory automation system operates multiple machinery components (e.g., sensors, actuators, etc.) to operate in cooperation with one another to provide control. When machinery components communicate with each other using, for example, a wired or wireless communication medium to operate in cooperation with one another, the machinery components need to be precisely synchronized with one another by use of a method provided in Non Patent Literature 1, IEEE Std. 1588-2008, "IEEE Standard for a Precision Clock Synchronization Protocol for Networked Measurement and Control Systems" a method provided in Non Patent Literature 2, IEEE Std. 802.1AS-2020, "IEEE Standard for Local and Metropolitan Area Networks-Timing and Synchronization for Time-Sensitive Applications" and/or the like.

In addition, for establishment of a network, it is important to measure the transmission delay time caused to occur in communication between machinery components for purposes of performing checking during designing and operation of a system in which the above-mentioned multiple machinery components operate in cooperation with one another.

A frame passing through a network is enabled to include a priority identifier for offering high priority transmission of specific communication data, and is processed in a queue in each device in that network according to the priority. An elapsed time of frame transmission, i.e., a transmission delay time, partially depends on the waiting situation of the queue, but a frame having a priority identifier indicating high priority tends to be transmitted with a shorter transmission delay time due to selection of a queue provided for high priority processing in each device. Conversely, a frame having a priority identifier indicating low priority tends to be transmitted with a longer transmission delay time.

As described above, the transmission delay time depends on the queue to be used for queuing of the frame in a device. Accordingly, to provide high precision control, there is a need to know the relationship between which queue is to be used among multiple queues included in the device and the resulting transmission delay time. That is, the transmission delay time of frame needs to be measured for each priority level assigned.

For example, Japanese Patent No. 5779664 discloses a technology to measure a transmission delay time by sending and receiving frames dedicated to delay measurement between nodes included in a network. This technology enables the transmission delay time to be measured for each frame priority.

However, the technology described in Japanese Patent No. 5779664 requires all the master and slave nodes included in a system to have functionality to send and receive not only time-synchronization frames defined in the above Non Patent Literature 1, but also frames dedicated to delay measurement. Thus, use of the technology described in Japanese Patent No. 5779664 requires machinery components to undergo major modification of communication functionality with a large amount of modification. This presents a problem of increase in workload required in verification of operation and/or the like.

SUMMARY OF THE INVENTION

In order to solve the above-stated problems, a communication system according to the present disclosure comprises: a master device; a slave device to time-synchronize with the master device; and a relay device to relay a signal between the master device and the slave device. The relay device includes an information setting unit to sets, in a frame, characteristic information about priority of the frame, the frame being received from either the master device or the slave device, and a time synchronization management unit to store a retention time of a first time-synchronization frame caused to occur during relaying of the first time-synchronization frame, to add the retention time of the first time-synchronization frame being stored to a correction field of a second time-synchronization frame when the second time-synchronization frame is relayed, to store a retention time of a third time-synchronization frame caused to occur during relaying of the third time-synchronization frame, and to add the retention time of the third time-synchronization frame being stored to a correction field of a fourth time-synchronization frame when the fourth time-synchronization frame is relayed, the first time-synchronization frame being a frame sent from the master device to the slave device, the second time-synchronization frame being a frame sent from the master device to the slave device, the third time-synchronization frame being a frame sent from the slave device to the master device, the fourth time-synchronization frame being a frame sent from the master device to the slave device. The slave device includes a transmission delay time aggregation unit to associate a value in the correction field of the second time-synchronization frame received from the relay device, with characteristic information set in the second time-synchronization frame, and store the value and the characteristic information of the second time-synchronization frame in association, and to associate a value in the correction field of the fourth time-synchronization frame received from the relay device, with characteristic information set in the fourth time-synchronization frame, and store the value and the characteristic information of the fourth time-synchronization frame in association.

BRIEF DESCRIPTION OF THE DRAWINGS

FIG. 3 is a diagram illustrating example structures of frames sent and received in the communication system according to the first embodiment;

FIG. 4 is a diagram illustrating a structure of the common message header included in the PTP message illustrated in FIG. 3;

DETAILED DESCRIPTION OF THE PREFERRED EMBODIMENTS

A communication system, a communication device, a communication method, a control circuit, and a storage medium according to embodiments of the present disclosure will be described in detail below with reference to the drawings. Note that although the following embodiments are described in the context of a system that uses the technology described in the above Non Patent Literature 1, i.e., IEEE 1588, the system may conform to IEEE 802.1AS described in the above Non Patent Literature 2.

First Embodiment

Figure 1:
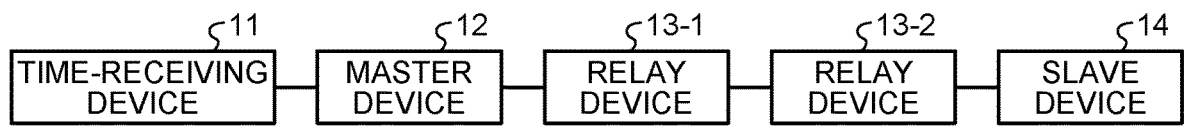
FIG. 1 is a diagram illustrating an example configuration of a communication system according to a first embodiment.

FIG. 1 is a diagram illustrating an example configuration of a communication system 100 according to a first embodiment. As is illustrated, the communication system 100 according to the first embodiment includes a time-receiving device 11, a master device 12, relay devices 13-1 and 13-2, and a slave device 14. The devices included in the communication system 100 are connected with each other via a local area network (LAN) line. In addition, the devices included in the communication system 100 each have a clock, and are configured to time-synchronize with one another by sending and receiving Precision Time Protocol (PTP) messages conforming to the above Non Patent Literature 1. PTP messages used for time synchronization will be described later.

The communication system 100 is used, for example, in factory automation. When the communication system 100 is used in factory automation, the master device 12 is, for example, connected to or incorporated in a control device that controls machinery components in the production site. The slave device 14 is connected to or incorporated in a machinery component in the production site, i.e., a machinery component to be controlled. The relay devices 13-1 and 13-2 are each a communication device for relaying data, control information, and the like sent and received between the master device 12 and the slave device 14. In addition, the communication system 100 has functionality to measure a transmission delay time by the master device 12, the relay devices 13-1 and 13-2, and the slave device 14 by performing the operation described later. Note that the example illustrated in FIG. 1 assumes that two relay devices are provided between the master device 12 and the slave device 14, but the number of relay devices are not limited thereto.

The time-receiving device 11 receives time information from a time source (not illustrated), which generates accurate time information by using a global positioning system (GPS) or the like.

Figure 2:
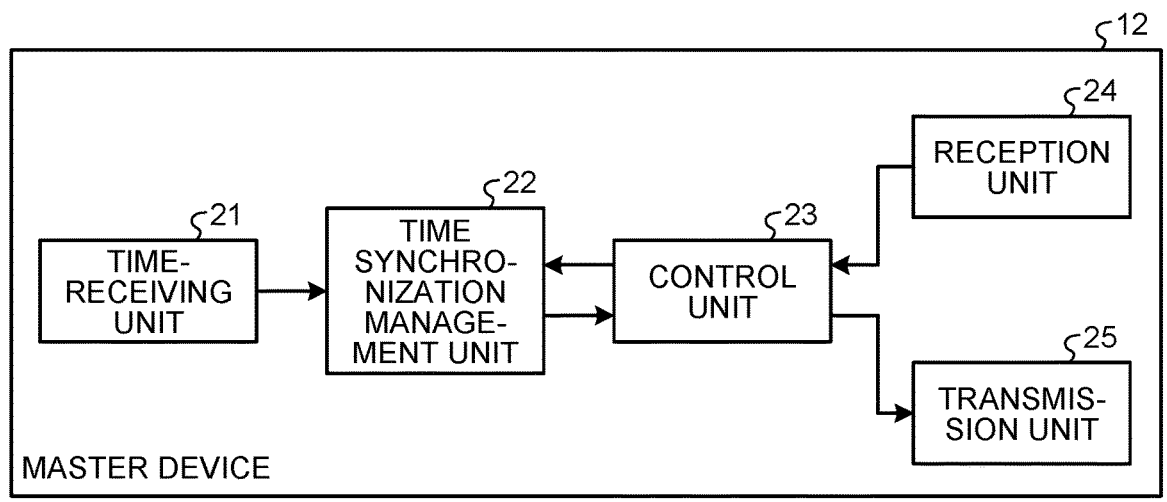
FIG. 2 is a diagram illustrating an example configuration of a master device according to the first embodiment.

FIG. 2 is a diagram illustrating an example configuration of the master device 12 according to the first embodiment. The master device 12 includes a time-receiving unit 21, a time synchronization management unit 22, a control unit 23, a reception unit 24, and a transmission unit 25.

The time-receiving unit 21 receives time information from the time-receiving device 11.

The time synchronization management unit 22 manages an internal clock of the master device 12. When the time-receiving unit 21 receives the time information from the time-receiving device 11, the time synchronization management unit 22 adjusts the time of the internal clock under management thereof, based on this time information. That is, the time synchronization management unit 22 adjusts the time of the internal clock to the time represented by the time information received by the time-receiving unit 21 from the time-receiving device 11.

The control unit 23 controls the entire part of the master device 12. In addition, the control unit 23 generates a frame, and outputs the frame to the transmission unit 25. The control unit 23 generates, for example, a frame storing a PTP message. Moreover, the control unit 23 analyzes a frame received by the reception unit 24, and performs processing based on an analysis result.

The reception unit 24 receives a frame through the LAN line, and outputs the frame received, to the control unit 23.

When the transmission unit 25 receives a frame from the control unit 23, the transmission unit 25 sends this frame to the LAN line.

An example of frames sent and received by the master device 12 to and from the slave device 14 through the relay devices 13-1 and 13-2 will now be described in the context of a frame storing a PTP message.

FIG. 3 is a diagram illustrating example structures of frames sent and received in the communication system 100 according to the first embodiment. Specifically, FIG. 3 illustrates a format of each frame that encapsulates a PTP message conforming to the above Non Patent Literature 1.

FIG. 3 illustrates two types of frames 210 and 220 each including a virtual local area network (VLAN) tag. The frame 210 illustrated in part (a) is used when the PTP message is to be sent and received using User Datagram Protocol (UDP). The frame 220 illustrated in part (b) is used when the PTP message is sent and received using an Ethernet (registered trademark) frame. A PTP message 230 encapsulated in each of the frames 210 and 220 includes a common message header 231 and a message field 232. The message field 232 includes, for example, fields dependent on the message of Sync, Delay_Req, Follow_Up, or Delay_Resp. The common message header 231 has a structure as illustrated in FIG. 4, and includes a correction field, which is correctionField 2311. Note that FIG. 4 is a diagram illustrating a structure of the common message header 231 included in the PTP message illustrated in FIG. 3.

The master device 12, the relay devices 13-1 and 13-2, and the slave device 14 send and receive PTP messages using the frame 210 ((a) PTP over IPv4/v6 UDP (including VLAN tag)) or the frame 220 ((b) PTP over IEEE 802.3/Ethernet (including VLAN tag)) having the structures illustrated in FIG. 3.

Figure 5:
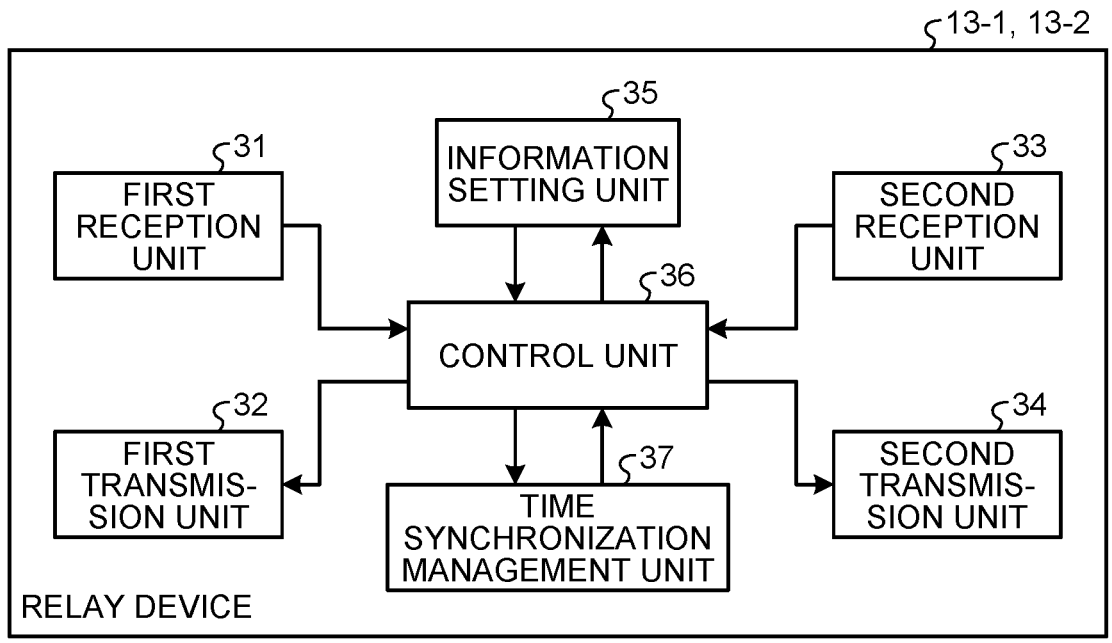
FIG. 5 is a diagram illustrating an example configuration of relay devices according to the first embodiment.

FIG. 5 is a diagram illustrating an example configuration of the relay devices 13-1 and 13-2 according to the first embodiment. The relay devices 13-1 and 13-2 have a same structure, and each include a first reception unit 31, a first transmission unit 32, a second reception unit 33, a second transmission unit 34, an information setting unit 35, a control unit 36, and a time synchronization management unit 37.

The relay devices 13-1 and 13-2 each store information about the adjacent devices, being set in advance. The control unit 36 of each of the relay devices 13-1 and 13-2 thus recognizes the adjacent devices. That is, the control unit 36 of the relay device 13-1 recognizes that the first reception unit 31 and the first transmission unit 32 are further connected to the master device 12, and that the second reception unit 33 and the second transmission unit 34 are further connected to the relay device 13-2. The control unit 36 of the relay device 13-2 recognizes that the first reception unit 31 and the first transmission unit 32 are further connected to the relay device 13-1, and that the second reception unit 33 and the second transmission unit 34 are further connected to the slave device 14.

The first reception unit 31 receives a frame through the LAN line provided on the master device 12 side, and outputs the frame received to the control unit 36. That is, the first reception unit 31 receives, through the LAN line, a frame sent from the master device 12 to the slave device 14, and outputs the frame received to the control unit 36.

When the first transmission unit 32 receives a frame from the control unit 36, the first transmission unit 32 sends this frame to the LAN line provided on the master device 12 side. That is, the first transmission unit 32 receives, from the control unit 36, a frame sent from the slave device 14 to the master device 12, and sends the frame to the LAN line provided on the master device 12 side.

The second reception unit 33 receives a frame through the LAN line provided on the slave device 14 side, and outputs the frame received to the control unit 36. That is, the second reception unit 33 receives, through the LAN line, a frame sent from the slave device 14 to the master device 12, and outputs the frame received to the control unit 36.

When the second transmission unit 34 receives a frame from the control unit 36, the second transmission unit 34 sends this frame to the LAN line provided on the slave device 14 side. That is, the second transmission unit 34 receives, from the control unit 36, a frame sent from the master device 12 to the slave device 14, and sends the frame to the LAN line provided on the slave device 14 side.

When one or both of the frame received by the first reception unit 31 and the frame received by the second reception unit 33 satisfy a specified condition, the information setting unit 35 changes the setting in the VLAN tag added to the corresponding one or both of the frames.

The control unit 36 controls the entire part of the relay device 13-1 or 13-2. In addition, the control unit 36 receives and analyzes the frame received by the first reception unit 31 and performs processing based on an analysis result, and receives and analyzes the frame received by the second reception unit 33 and performs processing based on an analysis result.

The time synchronization management unit 37 manages an internal clock of the relay device 13-1 or 13-2. In addition, the time synchronization management unit 37 performs an operation of storing a time of reception of a frame of a specific type and a time when the second transmission unit 34 sent this frame in a case in which the first reception unit 31 has received such frame; an operation of storing a time of reception of a frame of a specific type and a time when the first transmission unit 32 sent this frame in a case in which the second reception unit 33 has received such frame; an operation of determining a transmission delay time of frame from the stored times, and providing notification of the transmission delay time to the external device; and the like.

Figure 6:
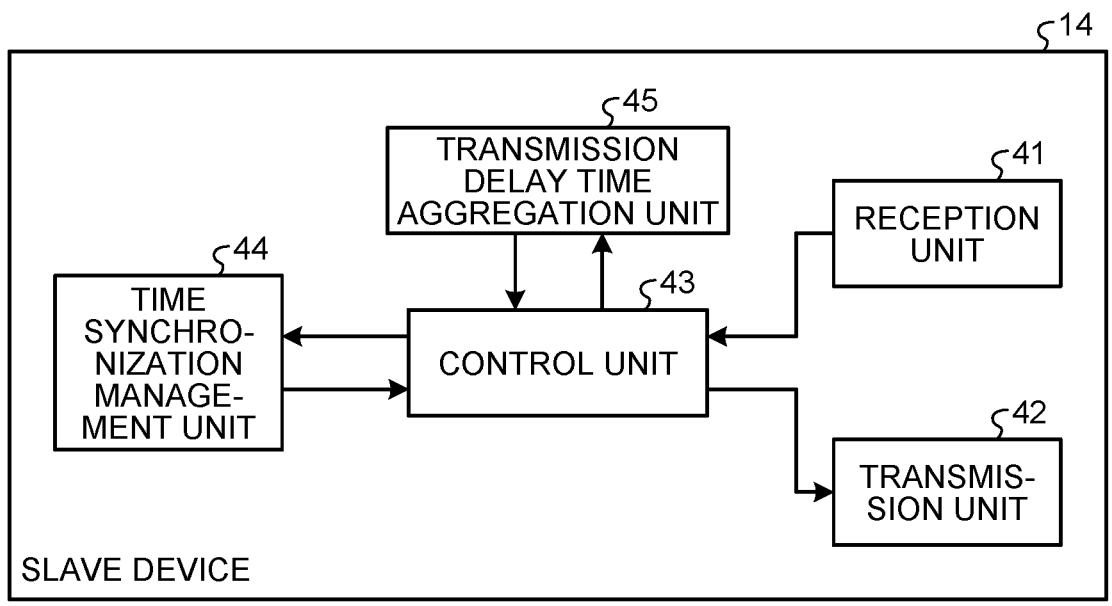
FIG. 6 is a diagram illustrating an example configuration of a slave device according to the first embodiment.

FIG. 6 is a diagram illustrating an example configuration of the slave device 14 according to the first embodiment. The slave device 14 includes a reception unit 41, a transmission unit 42, a control unit 43, a time synchronization management unit 44, and a transmission delay time aggregation unit 45.

The reception unit 41 receives a frame through the LAN line, and outputs the frame received to the control unit 43.

When the transmission unit 42 receives a frame from the control unit 43, the transmission unit 42 sends this frame to the LAN line.

The control unit 43 controls the entire part of the slave device 14. In addition, the control unit 43 analyzes the frame received by the reception unit 41, and performs processing based on an analysis result.

The time synchronization management unit 44 manages an internal clock of the slave device 14. The time synchronization management unit 44 adjusts, as appropriate, the time of the internal clock under management thereof to synchronize the time of the internal clock under management thereof with the time of the internal clock of the master device 12.

The transmission delay time aggregation unit 45 collects information about the transmission delay time caused to occur in the relay devices 13-1 and 13-2, and calculates the transmission delay time of frame caused to occur along the communication path from the master device 12 to the slave device 14 based on the information collected.

An operation of measuring the transmission delay time of a frame transmitted in the communication system 100 for each frame priority will next be described.

Figure 7:
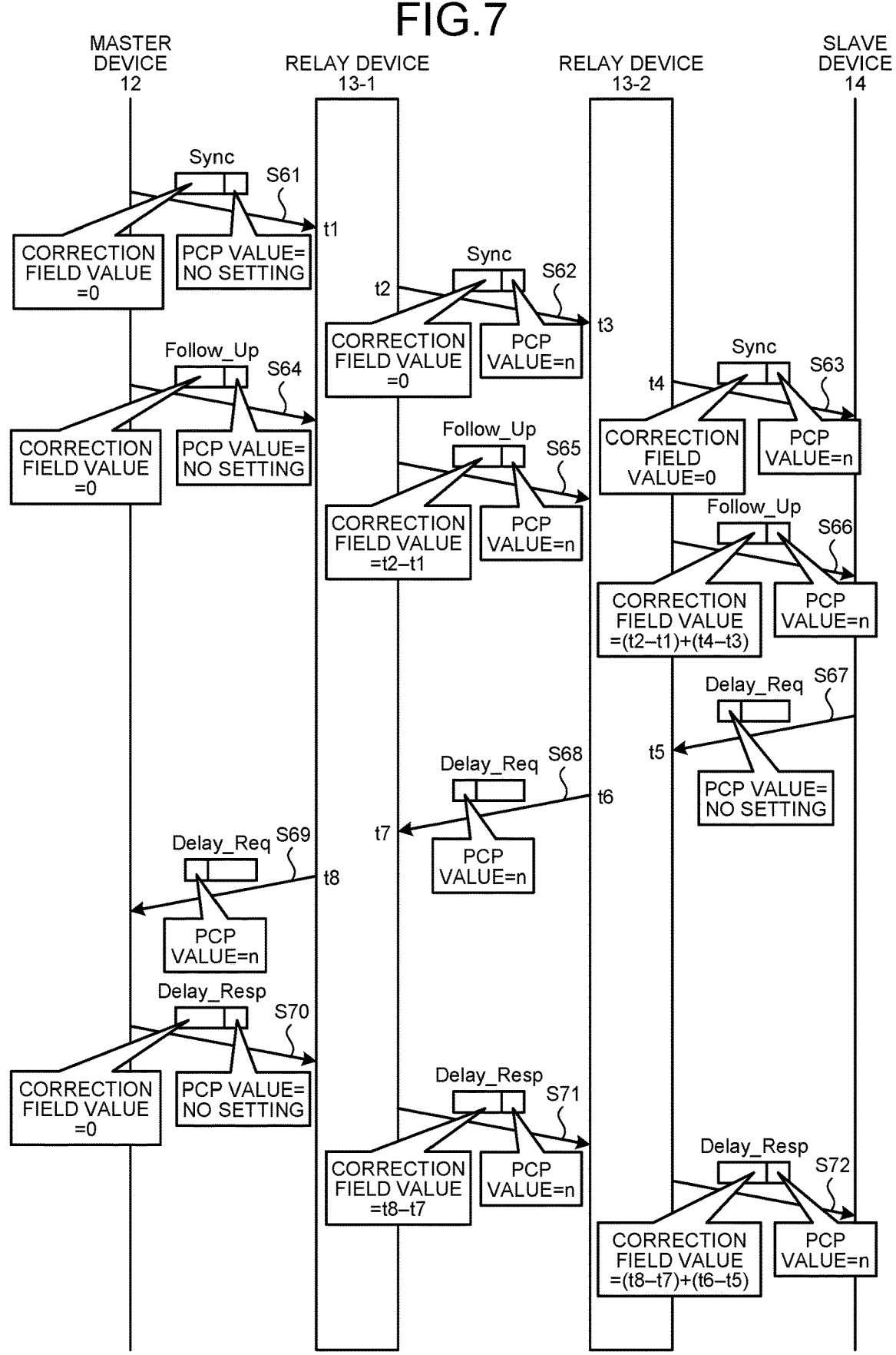
FIG. 7 is a sequence diagram illustrating an example of operation of measuring the transmission delay time of frame caused to occur in the communication system according to the first embodiment.

FIG. 7 is a sequence diagram illustrating an example of operation of measuring the transmission delay time of frame caused to occur in the communication system 100 according to the first embodiment.

As illustrated in FIG. 7, the communication system 100 causes four types of PTP messages, i.e., a Sync message, a Follow_Up message, a Delay_Req message, and a Delay_Resp message, to be sent and received between the master device 12 and the slave device 14 to measure the transmission delay time.

Operations of sending and receiving each of the foregoing four types of PTP messages will next be described. Note that each message is encapsulated into a frame, and is sent and received in the form of a frame. However, for simplicity of illustration, sending and receiving a frame containing an encapsulated message therein may herein be described as "sending and receiving a message".

[Operation of Sending and Receiving Sync Message]

A frame containing a Sync message encapsulated therein, which frame is a first time-synchronization frame, is sent from the master device 12. To send a Sync message, the master device 12 operates in such a manner that the time synchronization management unit 22 instructs the control unit 23 to generate a Sync message. In this operation, the time synchronization management unit 22 also notifies the control unit 23 of information about the structure of the frame to be used for sending the Sync message. This information is specifically information on an instruction to generate a frame having a VLAN tag (VID value=101 and the priority code point (PCP) value=no setting (e.g., PCP value=0)) with the correction field value=0 and time=T1, where the VID value is a VID value assigned to PTP, time T1 is the time indicated by the internal clock managed by the time synchronization management unit 22 of the master device 12, and the PCP value represents a priority level of the frame, which can take a value from 0 to 7. A higher PCP value indicates higher priority. The PCP value is an example of characteristic information about the priority level of a frame. The correction field is correctionField 2311 illustrated in FIG. 4.

The control unit 23 that has received the instruction from the time synchronization management unit 22 generates a Sync message compliant to the instruction, and outputs the Sync message to the transmission unit 25. The transmission unit 25 sends the Sync message received from the control unit 23 to the relay device 13-1 (step S61 of FIG. 7).

When the Sync message sent from the master device 12 arrives at the relay device 13-1, the relay device 13-1 sets a PCP value in the frame storing the Sync message, and transfers the resulting frame to the relay device 13-2 (step S62 of FIG. 7). Although the PCP value may be set to any value within a settable range, an example will be described below, by way of example, in which the PCP value in the frame is set to "7". Operations of sending and receiving a Follow_Up message, a Delay_Req message, and a Delay_Resp message will be described later also assuming that the PCP value in the frame is set to "7". Note that FIG. 8 illustrates the PCP value as "n" to generalize the description.

An operation of the relay device 13-1 to transfer the frame storing a Sync message will next be described.

Figure 8:
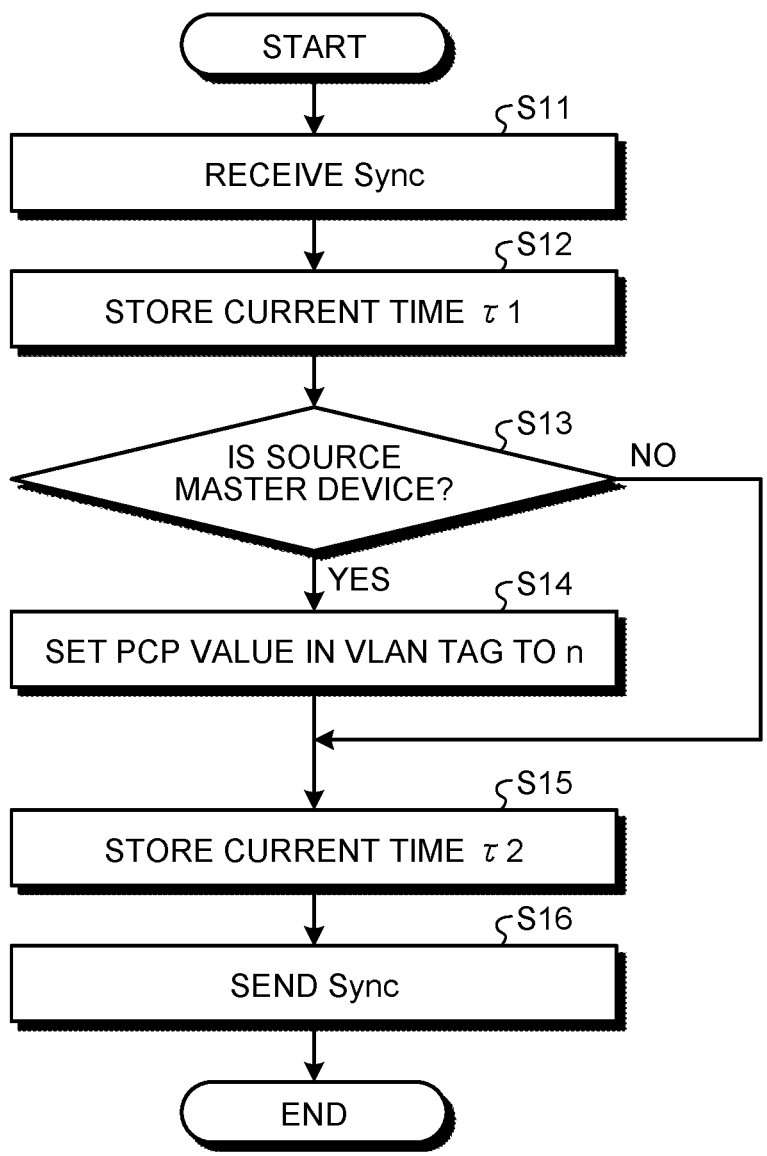
FIG. 8 is a flowchart illustrating an example of operation of relaying a Sync message performed by the relay devices according to the first embodiment.

FIG. 8 is a flowchart illustrating an example of operation of relaying a Sync message performed by the relay devices 13-1 according to the first embodiment. Note that an example of operation of relaying a Sync message performed by the relay device 13-2 is also illustrated by the flowchart of FIG. 8.

In the relay device 13-1, the first reception unit 31 receives the Sync message (step S11), and the time synchronization management unit 37 stores a current time τ1 as the time of reception of the Sync message (step S12). In the example illustrated in FIG. 7, the first reception unit 31 of the relay device 13-1 receives the Sync message at time t1. The time synchronization management unit 37 thus stores τ1=t1 at step S12.

Next, the information setting unit 35 checks whether the source of the Sync message is the master device 12 (step S13). When the source is not the master device 12, that is, when the source is the other relay device (step S13: No), the process proceeds to step S15. Alternatively, when the source of the Sync message is the master device 12 (step S13: Yes), the information setting unit 35 sets, to "7", the PCP value in the VLAN tag of the frame storing the Sync message (step S14). In the case of the relay device 13-1, the source of the Sync message is the master device 12, and the relay device 13-1 thus performs step S14 after step S13 to cause the information setting unit 35 to set the PCP value to "7". Note that when the PCP value is to be set to a value other than 7, the relay devices 13-1 and 13-2 also follow an operational flow identical to the operational flow to set the PCP value to "7". Thus, FIG. 8 illustrates the PCP value to be set, as "n", to generalize the description.

When the source of the Sync message is not the master device 12 (step S13: No), or when the PCP value in the VLAN tag has been set at step S14, the time synchronization management unit 37 stores a current time 12 as the time of sending of the Sync message (step S15), and the second transmission unit 34 sends the Sync message (step S16). The process then terminates. In the example illustrated in FIG. 7, the second transmission unit 34 of the relay device 13-1 sends the Sync message at time t2. The time synchronization management unit 37 of the relay device 13-1 thus stores τ2=t2 at step S15.

When the Sync message sent from the relay device 13-1 arrives at the relay device 13-2, the relay device 13-2 transfers the Sync message to the slave device 14 (step S63 of FIG. 7). An operation of the relay device 13-2 to perform this process will next be described.

When the Sync message arrives from the relay device 13-1, the relay device 13-2 performs operations of steps S11 to S13, S15, and S16 of FIG. 8. That is, the relay device 13-2 operates in such a manner that the first reception unit 31 receives the Sync message, the time synchronization management unit 37 stores the current time τ1 of reception of the Sync message, the time synchronization management unit 37 stores the current time τ2 of sending of the Sync message, and the second transmission unit 34 sends the Sync message. In the example illustrated in FIG. 7, the relay device 13-2 receives the Sync message at time t3, and sends the Sync message at time t4. Accordingly, the time synchronization management unit 37 of the relay device 13-2 stores τ1=t3 as the time of reception of the Sync message, and stores τ2=t4 as the time of sending of the Sync message.

When the Sync message sent from the relay device 13-2 arrives at the slave device 14, the slave device 14 stores the time of reception of the Sync message. Specifically, in the slave device 14, the reception unit 41 receives the Sync message, and the control unit 43 notifies the time synchronization management unit 44 of reception of the Sync message. The time synchronization management unit 44 stores as T2 the time indicated by the internal clock upon reception of the notification from the control unit 43, i.e., the time of reception of the Sync message. In addition, the time synchronization management unit 44 stores the value of T1 given in the Sync message. As described above, T1 represents the time when the master device 12 sent the Sync frame.

[Operation of Sending and Receiving Follow_Up Message]

A frame containing a Follow_Up message encapsulated therein, which frame is a second time-synchronization frame, is sent from the master device 12. To send a Follow_Up message, the master device 12 operates in such a manner that the time synchronization management unit 22 instructs the control unit 23 to generate a Follow_Up message. In this operation, the time synchronization management unit 22 also notifies the control unit 23 of information about the structure of the frame to be used for sending the Follow_Up message. This information is specifically information on an instruction to generate a frame having a VLAN tag (VID value=101 and the PCP value=no setting (e.g., PCP value=0)) with the correction field value=0.

The control unit 23 that has received the instruction from the time synchronization management unit 22 generates a Follow_Up message compliant to the instruction, and outputs the Follow_Up message to the transmission unit 25. The transmission unit 25 sends the Follow_Up message received from the control unit 23 to the relay device 13-1 (step S64 of FIG. 7).

When the Follow_Up message sent from the master device 12 arrives at the relay device 13-1, the relay device 13-1 sets a PCP value in the frame storing the Follow_Up message, updates the correction field value, and transfers the resulting frame to the relay device 13-2 (step S65 of FIG. 7). An operation of the relay device 13-1 to perform this process will next be described.

Figure 9:
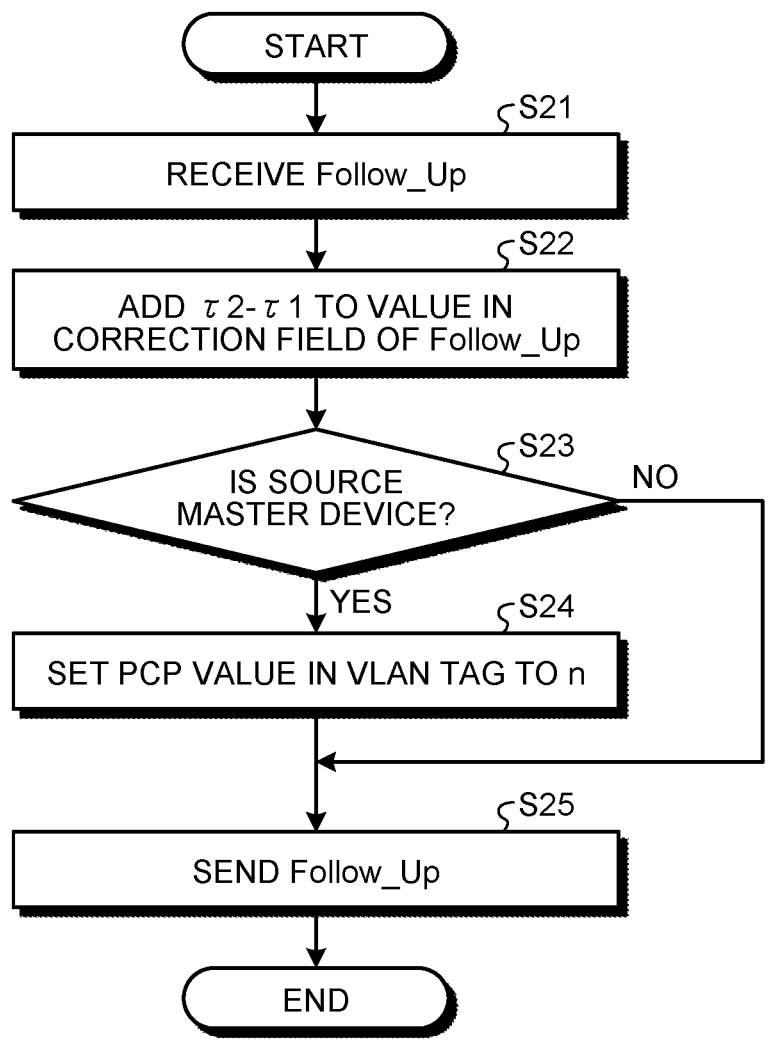
FIG. 9 is a flowchart illustrating an example of operation of relaying a Follow_Up message performed by the relay devices according to the first embodiment.

FIG. 9 is a flowchart illustrating an example of operation of relaying a Follow_Up message performed by the relay devices 13-1 according to the first embodiment. Note that an example of operation of relaying a Follow_Up message performed by the relay device 13-2 is also illustrated by the flowchart of FIG. 9.

In the relay device 13-1, the first reception unit 31 receives the Follow_Up message (step S21), and the time synchronization management unit 37 adds the retention time (τ2−τ1) of the Sync message caused to occur during relaying of the Sync message, to the value in the correction field of the Follow_Up message (step S22). In the example illustrated in FIG. 7, the relay device 13-1 undergoes a retention time of the Sync message equal to t2−t1. Thus, at step S22, the time synchronization management unit 37 adds a value of t2−t1 to the value in the correction field.

Next, the information setting unit 35 checks whether the source of the Follow_Up message is the master device 12 (step S23). When the source is not the master device 12, that is, when the source is the other relay device (step S23: No), the process proceeds to step S25. Alternatively, when the source of the Follow_Up message is the master device 12 (step S23: Yes), the information setting unit 35 sets, to "7", the PCP value in the VLAN tag of the frame storing the Follow_Up message (step S24). In the case of the relay device 13-1, the source of the Follow_Up message is the master device 12, and the relay device 13-1 thus performs step S24 after step S23 to cause the information setting unit 35 to set the PCP value to "7". Note that when the PCP value is to be set to a value other than 7, the relay devices 13-1 and 13-2 also follow an operational flow identical to the operational flow to set the PCP value to "7". Thus, FIG. 9 illustrates the PCP value to be set, as "n", to generalize the description.

When the source of the Follow_Up message is not the master device 12 (step S23: No), or when the PCP value in the VLAN tag has been set at step S24, the second transmission unit 34 sends the Follow_Up message (step S25). The process then terminates. The second transmission unit 34 of the relay device 13-1 sends the Follow_Up message to the relay device 13-2 at step S25.

When the Follow_Up message sent from the relay device 13-1 arrives at the relay device 13-2, the relay device 13-2 transfers the Follow_Up message to the slave device 14 (step S66 of FIG. 7). An operation of the relay device 13-2 to perform this process will next be described.

When the Follow_Up message arrives from the relay device 13-1, the relay device 13-2 performs operations of steps S21 to S23 and S25 of FIG. 9. That is, the relay device 13-2 operates in such a manner that the first reception unit 31 receives the Follow_Up message, and the time synchronization management unit 37 adds the retention time (τ2−τ1) of the Sync message to the correction field value of the Follow_Up message. The second transmission unit 34 sends the Follow_Up message. In the example illustrated in FIG. 7, the relay device 13-2 undergoes a retention time of the Sync message equal to t4−t3. Thus, the time synchronization management unit 37 adds a value of t4−t3 to the value in the correction field.

When the Follow_Up message sent from the relay device 13-2 arrives at the slave device 14, the slave device 14 stores the value in the correction field given in the Follow_Up message. Specifically, the time synchronization management unit 44 associates the value in the correction field ((t2−t1)+(t4−t3)) with the PCP value (n=7) in the Follow_Up message, and stores these values in association.

[Operation of Sending and Receiving Delay_Req Message]

A frame containing a Delay_Req message encapsulated therein, which frame is a third time-synchronization frame, is sent from the slave device 14. To send a Delay_Req message, the slave device 14 operates in such a manner that the time synchronization management unit 44 instructs the control unit 43 to generate a Delay_Req message. In this operation, the time synchronization management unit 44 also notifies the control unit 43 of information about the structure of the frame to be used for sending the Delay_Req message. This information is specifically information on an instruction to generate a frame having a VLAN tag (VID value=101 and the PCP value=no setting (e.g., PCP value=0)). In addition, the time synchronization management unit 44 stores time T3, which is indicated by the internal clock at the time of issuing the instruction to the control unit 43 to generate the Delay_Req message.

The control unit 43 that has received the instruction from the time synchronization management unit 44 generates a Delay_Req message compliant to the instruction, and outputs the Delay_Req message to the transmission unit 42. The transmission unit 42 sends the Delay_Req message received from the control unit 43 to the relay device 13-2 (step S67 of FIG. 7).

When the Delay_Req message sent from the slave device 14 arrives at the relay device 13-2, the relay device 13-2 sets a PCP value in the frame storing the Delay_Req message, and transfers the resulting frame to the relay device 13-1 (step S68 of FIG. 7). An operation of the relay device 13-2 to perform this process will next be described.

Figure 10:
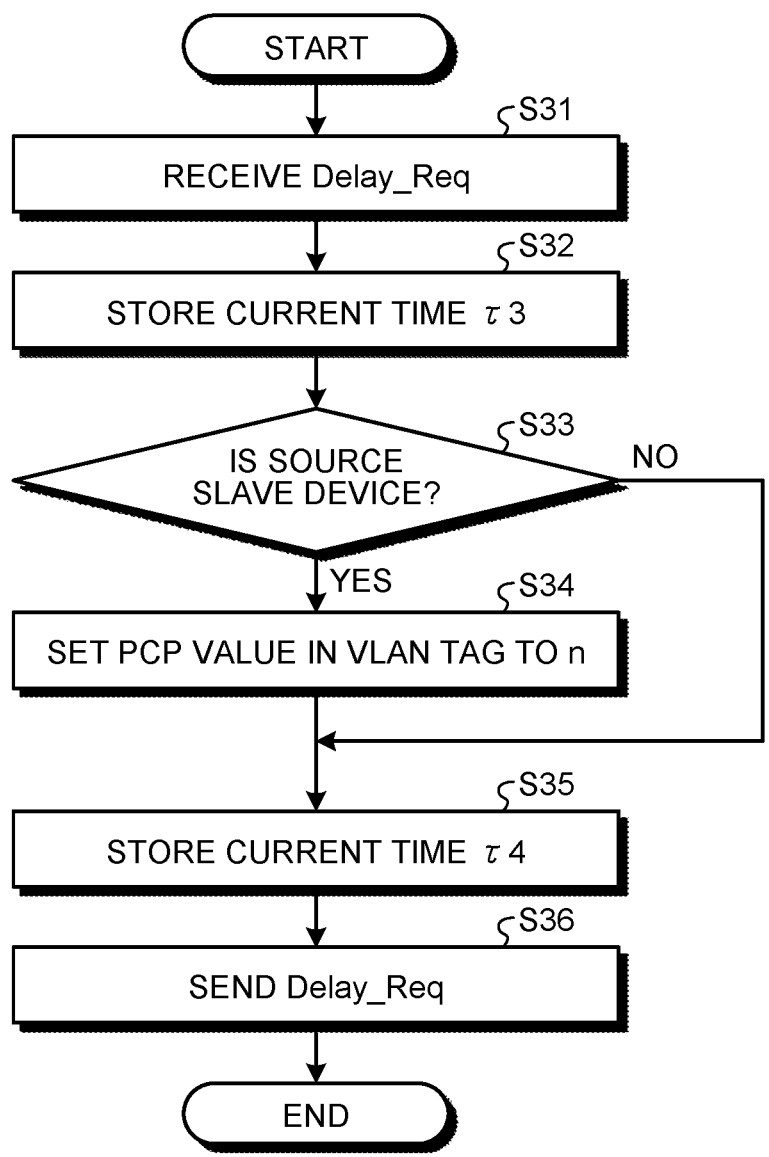
FIG. 10 is a flowchart illustrating an example of operation of relaying a Delay_Req message performed by the relay devices according to the first embodiment.

FIG. 10 is a flowchart illustrating an example of operation of relaying a Delay_Req message performed by the relay devices 13-2 according to the first embodiment. Note that an example of operation of relaying a Delay_Req message performed by the relay device 13-1 is also illustrated by the flowchart of FIG. 10.

In the relay device 13-2, the second reception unit 33 receives the Delay_Req message (step S31), and the time synchronization management unit 37 stores a current time 13 as the time of reception of the Delay_Req message (step S32). In the example illustrated in FIG. 7, the second reception unit 33 of the relay device 13-2 receives the Delay_Req message at time t5. The time synchronization management unit 37 thus stores τ3=t5 at step S32.

Next, the information setting unit 35 checks whether the source of the Delay_Req message is the slave device 14 (step S33). When the source is not the slave device 14, that is, when the source is the other relay device (step S33: No), the process proceeds to step S35. Alternatively, when the source of the Delay_Req message is the slave device 14 (step S33: Yes), the information setting unit 35 sets, to "7", the PCP value in the VLAN tag of the frame storing the Delay_Req message (step S34). In the case of the relay device 13-2, the source of the Delay_Req message is the slave device 14, and the relay device 13-2 thus performs step S34 after step S33 to cause the information setting unit 35 to set the PCP value to "7". Note that when the PCP value is to be set to a value other than 7, the relay devices 13-1 and 13-2 also follow an operational flow identical to the operational flow to set the PCP value to "7". Thus, FIG. 10 illustrates the PCP value to be set, as "n", to generalize the description.

When the source of the Delay_Req message is not the slave device 14 (step S33: No), or when the PCP value in the VLAN tag has been set at step S34, the time synchronization management unit 37 stores a current time t4 as the time of sending of the Delay_Req message (step S35), and the first transmission unit 32 sends the Delay_Req message (step S36). The process then terminates. The first transmission unit 32 of the relay device 13-2 sends the Delay_Req message to the relay device 13-1 at step S36. In the example illustrated in FIG. 7, the first transmission unit 32 of the relay device 13-2 sends the Delay_Req message at time t6. The time synchronization management unit 37 thus stores τ4=t6 at step S35.

When the Delay_Req message sent from the relay device 13-2 arrives at the relay device 13-1, the relay device 13-1 transfers the Delay_Req message to the master device 12 (step S69 of FIG. 7). An operation of the relay device 13-1 to perform this process will next be described.

When the Delay_Req message arrives from the relay device 13-2, the relay device 13-1 performs operations of steps S31 to S33, S35, and S36 of FIG. 10. That is, the relay device 13-1 operates in such a manner that the second reception unit 33 receives the Delay_Req message, the time synchronization management unit 37 stores the current time τ3 of reception of the Delay_Req message, the time synchronization management unit 37 stores the current time τ4 of sending of the Delay_Req message, and the first transmission unit 32 sends the Delay_Req message. In the example illustrated in FIG. 7, the relay device 13-1 receives the Delay_Req message at time t7, and sends the Delay_Req message at time t8. Accordingly, the time synchronization management unit 37 of the relay device 13-1 stores τ3=t7 as the time of reception of the Delay_Req message, and stores τ4=t8 as the time of sending of the Delay_Req message.

When the Delay_Req message sent from the relay device 13-1 arrives at the master device 12, the master device 12 stores the time of reception of the Delay_Req message. Specifically, in the master device 12, the reception unit 24 receives the Delay_Req message, and the control unit 23 notifies the time synchronization management unit 22 of reception of the Delay_Req message. The time synchronization management unit 22 stores as T4 the time indicated by the internal clock upon reception of the notification from the control unit 23, i.e., the time of reception of the Delay_Req message.

[Operation of Sending and Receiving Delay_Resp Message]

A frame containing a Delay_Resp message encapsulated therein, which frame is a fourth time-synchronization frame, is sent from the master device 12. To send a Delay_Resp message, the master device 12 operates in such a manner that the time synchronization management unit 22 instructs the control unit 23 to generate a Delay_Resp message. In this operation, the time synchronization management unit 22 also notifies the control unit 23 of information about the structure of the frame to be used for sending the Delay_Resp message. This information is specifically information on an instruction to generate a frame having a VLAN tag (VID value=101 and the PCP value=no setting (e.g., PCP value=0)) with the correction field value=0 and time=T4.

The control unit 23 that has received the instruction from the time synchronization management unit 22 generates a Delay_Resp message compliant to the instruction, and outputs the Delay_Resp message to the transmission unit 25. The transmission unit 25 sends the Delay_Resp message received from the control unit 23 to the relay device 13-1 (step S70 of FIG. 7).

When the Delay_Resp message sent from the master device 12 arrives at the relay device 13-1, the relay device 13-1 sets a PCP value in the frame storing the Delay_Resp message, updates the correction field value, and transfers the resulting frame to the relay device 13-2 (step S71 of FIG. 7). An operation of the relay device 13-1 to perform this process will next be described.

Figure 11:
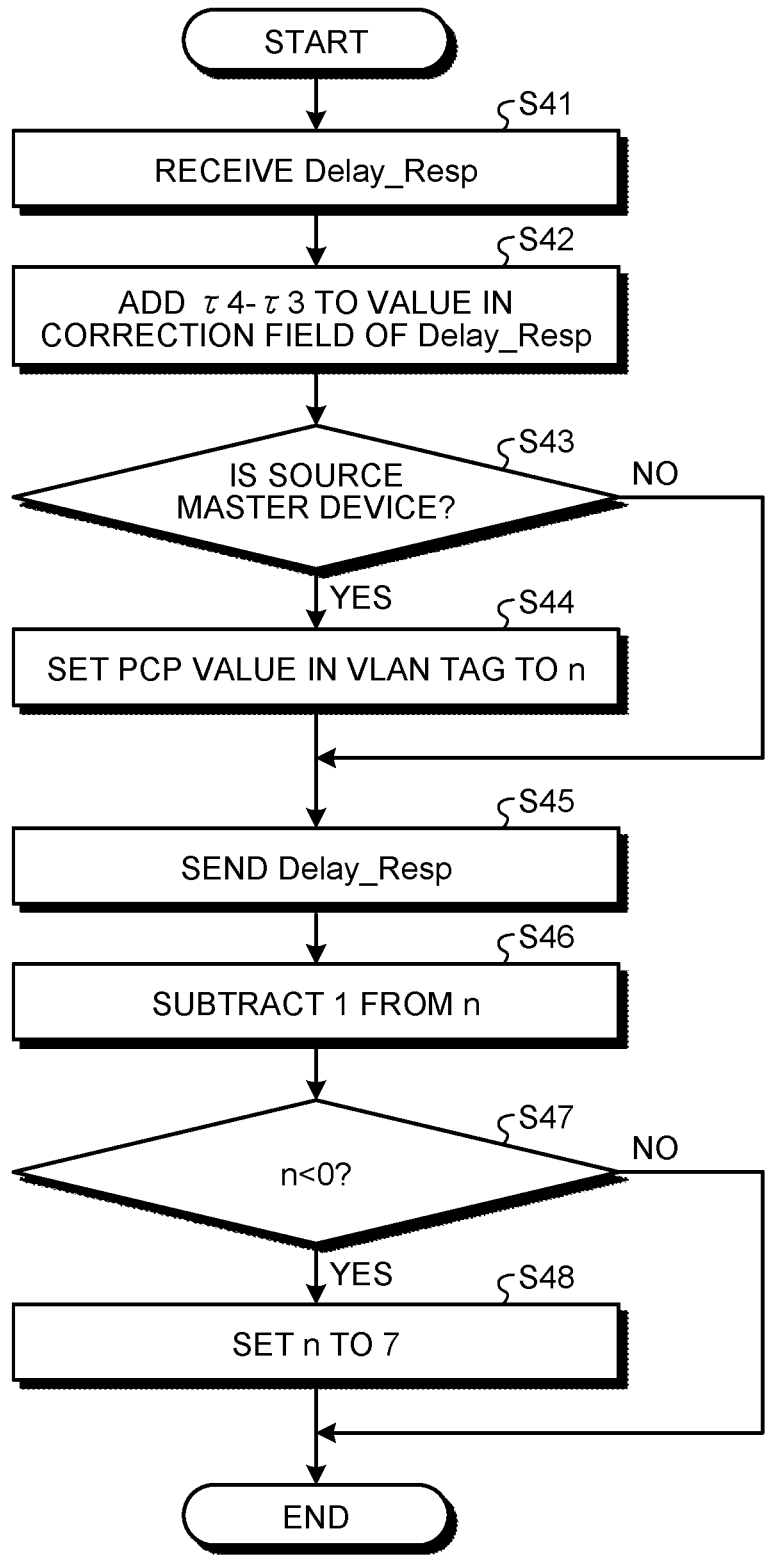
FIG. 11 is a flowchart illustrating an example of operation of relaying a Delay_Resp message performed by the relay devices according to the first embodiment.

FIG. 11 is a flowchart illustrating an example of operation of relaying a Delay_Resp message performed by the relay devices 13-1 according to the first embodiment. Note that an example of operation of relaying a Delay_Resp message performed by the relay device 13-2 is also illustrated by the flowchart of FIG. 11.

In the relay device 13-1, the first reception unit 31 receives the Delay_Resp message (step S41), and the time synchronization management unit 37 adds the retention time (τ4−τ3) of the Delay_Req message caused to occur during relaying of the Delay_Req message, to the value in the correction field of the Delay_Resp message (step S42). In the example illustrated in FIG. 7, the relay device 13-1 undergoes a retention time of the Delay_Req message equal to t8−t7. Thus, at step S42, the time synchronization management unit 37 adds a value of t8−t7 to the value in the correction field.

Next, the information setting unit 35 checks whether the source of the Delay_Resp message is the master device 12 (step S43). When the source is not the master device 12, that is, when the source is the other relay device (step S43: No), the process proceeds to step S45. Alternatively, when the source of the Delay_Resp message is the master device 12 (step S43: Yes), the information setting unit 35 sets, to "7", the PCP value in the VLAN tag of the frame storing the Delay_Resp message (step S44). In the case of the relay device 13-1, the source of the Delay_Resp message is the master device 12, and the relay device 13-1 thus performs step S44 after step S43 to cause the information setting unit 35 to set the PCP value to "7". Note that when the PCP value is to be set to a value other than 7, the relay devices 13-1 and 13-2 also follow an operational flow identical to the operational flow to set the PCP value to "7". Thus, FIG. 11 illustrates the PCP value to be set, as "n", to generalize the description.

When the source of the Delay_Resp message is not the master device 12 (step S43: No), or when the PCP value in the VLAN tag has been set at step S44, the second transmission unit 34 sends the Delay_Resp message (step S45). The second transmission unit 34 of the relay device 13-1 sends the Delay_Resp message to the relay device 13-2 at step S45.

Next, the information setting unit 35 subtracts "1" from the PCP value (n) (step S46). When the value of n resulting from subtraction of "1" is not less than 0 (step S47: No), the process terminates. When the value of n resulting from subtraction of "1" is less than 0 (step S47: Yes), the information setting unit 35 changes the value of n to "7" (step S48), and the process then terminates. Since this example assumes that the PCP value=7, the relay devices 13-1 terminates the process without performing step S48.

When the Delay_Resp message sent from the relay device 13-1 arrives at the relay device 13-2, the relay device 13-2 transfers the Delay_Resp message to the slave device 14 (step S72 of FIG. 7). An operation of the relay device 13-2 to perform this process will next be described.

When the Delay_Resp message arrives from the relay device 13-1, the relay device 13-2 performs operations of steps S41 to S43 and S45 of FIG. 11. That is, the relay device 13-2 operates in such a manner that the first reception unit 31 receives the Delay_Resp message, and the time synchronization management unit 37 adds the retention time (τ4−τ3) of the Delay_Req message to the correction field value of the Delay_Resp message. The second transmission unit 34 sends the Delay_Resp message. In the example illustrated in FIG. 7, the relay device 13-2 undergoes a retention time of the Delay_Req message equal to t6−t5. Thus, the time synchronization management unit 37 adds a value of t6−t5 to the value in the correction field.

When the Delay_Resp message sent from the relay device 13-2 arrives at the slave device 14, the slave device 14 stores the value in the correction field and time information (T4) given in the Delay_Resp message. Specifically, in the slave device 14, the reception unit 41 receives the Delay_Resp message, and the control unit 43 notifies the time synchronization management unit 44 of reception of the Delay_Resp message. The time synchronization management unit 44 stores the value in the correction field ((t8−t7)+(t6−t5)) and time information (T4) given in the Delay_Resp message. In addition, the transmission delay time aggregation unit 45 associates the value in the correction field ((t8−t7)+(t6−t5)) with the PCP value (n=7) in the Delay_Resp message, and stores these values in association.

Performing the foregoing operations of sending and receiving a Sync message, a Follow_Up message, a Delay_Req message, and a Delay_Resp message enables an average path delay to be calculated. The average path delay is the transmission delay along the communication path from the master device 12 to the slave device 14.

The average path delay is calculated in the time synchronization management unit 44 of the slave device 14 based on Equation (1). In Equation (1), "Correction field of Sync" refers to the value that is set in the correction field of the Sync message received by the slave device 14; "Correction field of Follow_Up" refers to the value that is set in the correction field of the Follow_Up message received by the slave device 14; and "Correction field of Delay_Resp" refers to the value that is set in the correction field of the Delay_Resp message received by the slave device 14.

$$\text{(Average path delay)} = \{(T2-T3)+(T4-T1)-(\text{Correction field of Sync})-(\text{Correction field of Follow\_Up})-(\text{Correction field of Delay\_Resp})\}/2 \quad (1)$$

The time synchronization management unit 44 of the slave device 14 calculates a slave device time difference based on Equation (2) using the average path delay calculated according to Equation (1). The slave device time difference is the offset of the time in the slave device 14 with respect to the time in the master device 12. The slave device 14 can be time-synchronized with the master device 12 by calculating the slave device time difference and then correcting the clock of the time synchronization management unit 44 of the slave device 14.

$$\text{(Slave device time difference)} = (T2-T1)-(\text{Average path delay})-(\text{Correction field of Sync})-(\text{Correction field of Follw\_Up}) \quad (2)$$

The retention time of a Sync message can be considered as the retention time of a frame in the downstream direction (i.e., direction from the master device 12 to the slave device 14). The retention time of a Delay_Req message can be considered as the retention time of a frame in the upstream direction (i.e., direction from the slave device 14 to the master device 12). The above series of operations means that the transmission delay time aggregation unit 45 of the slave device 14 stores the total value of the retention times ((t2−t1)+(t4−t3)) of the respective relay devices 13-1 and 13-2 of a frame in the downstream direction when the PCP value=7, and the total value of the retention times ((t8−t7)+(t6−t5)) of the respective relay devices 13-1 and 13-2 of an upstream frame when the PCP value=7.

By performing the above series of operations while changing the PCP value to be set in transferring a frame by the relay device 13-1 or 13-2, the transmission delay time aggregation unit 45 of the slave device 14 can calculate and store, for each PCP value, the transmission delay time of frame in each of the upstream direction and downstream direction.

The above series of operations may be repeatedly performed while changing the PCP value from 0 to 7 (in ascending order) or at random for queuing a corresponding task to a measurement queue.

In addition, the above series of operations may be performed to assign a PCP value to the Sync message and to the Delay_Resp message in different orders. In this process, the Follow_Up message is given (assigned) a PCP value identical to the PCP value that has been set in the Sync message immediately before, and the Delay_Resp message is given (assigned) a PCP value identical to the PCP value that has been set in the Delay_Req message immediately before.

Measurement may be performed multiple times for a single PCP value. When measurement is performed multiple times, the representative value of the results of the multiple measurements may be an average value, a maximum value, or a minimum value of the results, or a weighted average obtained by using a greater or less weight for a more recent measurement result.

The transmission delay time in the above series of operations may be associated with another element (e.g., the type of service (ToS) value in the IPv4 header, Traffic Class in the IPv6 header, the frame length, the payload content of the frame, or the like) that indicates a characteristic of the frame as the characteristic information of the frame, in place of, or in addition to, the PCP value in the VLAN tag. Also in such case, a similar result (the transmission delay time of frame in each of the upstream direction and downstream direction) is obtainable.

Each of the PTP messages has an extension field, and when sending each of the PTP messages, each relay device may write the retention time of that relay device into this extension field, and then send the resulting PTP message. Such operation allows the master device, the other relay device, the slave device, or another connected device to be notified of not only the total value of the retention times but also the retention time in each of the relay devices.

As described above, in the communication system 100 according to the present embodiment, each of the relay devices (relay devices 13-1 and 13-2) that relay a frame between the master device 12 and the slave device 14 sets a priority level in frames containing PTP messages designed for time synchronization (i.e., Sync message, Follow_Up message, Delay_Req message, and Delay_Resp message) during the relaying process to calculate, for each priority level, the retention time of a frame in each of the relay devices. Each of the relay devices then sends the calculated value of the retention time to the slave device 14. This enables the slave device 14 to aggregate the retention time of a frame in each of the relay devices for each priority level, and to calculate the transmission delay time of frame at each priority level. In addition, the transmission delay time of frame can be measured for each priority level using time-synchronization frames. That is, the transmission delay time of frame can be measured for each priority level without using a dedicated frame.

A hardware configuration for implementing the master device 12, the relay devices 13-1 and 13-2, and the slave device 14 will next be described.

The following description describes the master device 12. The master device 12 is implemented by, for example, a processor 101, a memory 102, a transmission circuit 103, and a reception circuit 104 illustrated in FIG. 12. Note that FIG. 12 is a diagram illustrating an example of hardware for implementing the master device 12.

The processor 101 is a central processing unit (CPU) (also known as processing unit, computing unit, microprocessor, microcomputer, and digital signal processor (DSP)), a system large scale integration (LSI), or the like. The memory 102 is a random access memory (RAM), a read-only memory (ROM), an erasable programmable read-only memory (EPROM), an electrically erasable programmable read-only memory (EEPROM) (registered trademark), or the like. The transmission circuit 103 is an electronic circuit that transmits a signal to a communication line. The reception circuit 104 is an electronic circuit that receives a signal from a communication line.

The time-receiving unit 21, the time synchronization management unit 22, and the control unit 23 of the master device 12 can be implemented by the processor 101 and the memory 102. That is, the time-receiving unit 21, the time synchronization management unit 22, and the control unit 23 of the master device 12 can be implemented by storing in advance in the memory 102 a program for providing operation of the time-receiving unit 21, the time synchronization management unit 22, and the control unit 23 of the master device 12, and by reading and executing this program by the processor 101. Note that the program to be stored in the memory 102 for providing operation of the time-receiving unit 21, the time synchronization management unit 22, and the control unit 23 may be provided to a user or the like by, for example, being stored in a storage medium such as a compact disc (CD)-ROM or a digital versatile disc (DVD)-ROM, or via a network.

Figure 12:
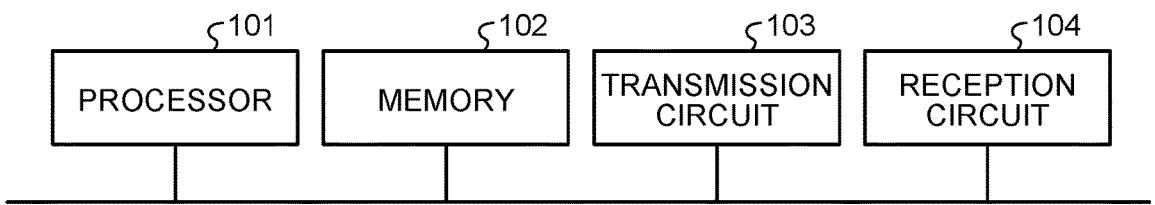
FIG. 12 is a diagram illustrating an example of hardware for implementing the master device.

Alternatively, unlike the example of hardware of FIG. 12 in which the master device 12 is implemented by the general-purpose processor 101 and the memory 102, the master device 12 may be implemented by dedicated processing circuitry rather than by the combination of the processor 101 and the memory 102. That is, the time-receiving unit 21, the time synchronization management unit 22, and the control unit 23 of the master device 12 may be implemented in dedicated processing circuitry. In this respect, the dedicated processing circuitry is a single circuit, a set of multiple circuits, an application specific integrated circuit (ASIC), a field programmable gate array (FPGA), or a circuit of a combination thereof. Note that the time-receiving unit 21, the time synchronization management unit 22, and the control unit 23 may be implemented in such a manner that part thereof is implemented by the processor 101 and the memory 102 and the rest thereof is implemented by dedicated processing circuitry.

In the master device 12, the reception unit 24 is implemented in the reception circuit 104, and the transmission unit 25 is implemented in the transmission circuit 103.

Note that the memory 102 is also used as a temporary memory by the processor 101 to perform various computation tasks. The reception circuit 104 is also used by the time-receiving unit 21 to receive time information.

The relay devices 13-1 and 13-2 and the slave device 14 can also be implemented by hardware similar to the hardware that can implement the master device 12. That is, the relay devices 13-1 and 13-2 and the slave device 14 can also be implemented by hardware similar to the set of the processor 101, the memory 102, the transmission circuit 103, and the reception circuit 104 illustrated in FIG. 12.

The information setting unit 35, the control unit 36, and the time synchronization management unit 37 of each of the relay devices 13-1 and 13-2 can be implemented by executing, by the processor 101, a program for providing operation of these components. These components may be implemented in dedicated processing circuitry as described above such as a single circuit, a set of multiple circuits, or an ASIC. In each of the relay devices 13-1 and 13-2, the first reception unit 31 and the second reception unit 33 are implemented in the reception circuit 104, and the first transmission unit 32 and the second transmission unit 34 are implemented in the transmission circuit 103.

The control unit 43, the time synchronization management unit 44, and the transmission delay time aggregation unit 45 of the slave device 14 can be implemented by executing, by the processor 101, a program for providing operation of these components. These components may be implemented in dedicated processing circuitry as described above such as a single circuit, a set of multiple circuits, or an ASIC. In the slave device 14, the reception unit 41 is implemented in the reception circuit 104, and the transmission unit 42 is implemented in the transmission circuit 103.

Second Embodiment

In the first embodiment, the slave device 14 associates a transmission delay time with a priority level, and stores these values in association to calculate the transmission delay time of frame at each priority level. In contrast, in a second embodiment, relay devices associate a transmission delay time with a priority level, and stores these values in association to calculate the transmission delay time of frame at each priority level. The description of the present embodiment will omit description common to the first embodiment.

Figure 13:
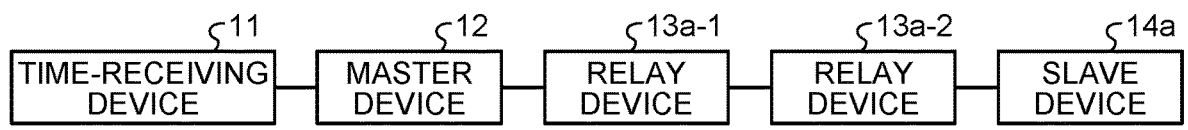
FIG. 13 is a diagram illustrating an example configuration of a communication system according to a second embodiment.

FIG. 13 is a diagram illustrating an example configuration of a communication system 100a according to the second embodiment. As is illustrated, the communication system 100a according to the second embodiment includes the time-receiving device 11, the master device 12, relay devices 13a-1 and 13a-2, and a slave device 14a. Similarly to the configuration in the first embodiment, the devices included in the communication system 100a are connected with each other via a LAN line. That is, the communication system 100a includes the relay device 13a-1, the relay device 13a-2, and the slave device 14a respectively in place of the relay device 13-1, the relay device 13-2, and the slave device 14 of the communication system 100 described in the first embodiment. The description of the present embodiment will omit description common to the first embodiment. The devices included in the communication system 100a each have a clock, and are configured to be time-synchronized with one another by sending and receiving frames each storing a PTP message, similarly to the first embodiment.

Similarly to the first embodiment, the time-receiving device 11, the master device 12, the relay devices 13a-1 and 13a-2, and the slave device 14a send and receive PTP messages using the frame 210 or the frame 220 having a structure illustrated in FIG. 3.

The master device 12 is configured the same as the master device 12 in the first embodiment.

Figure 14:
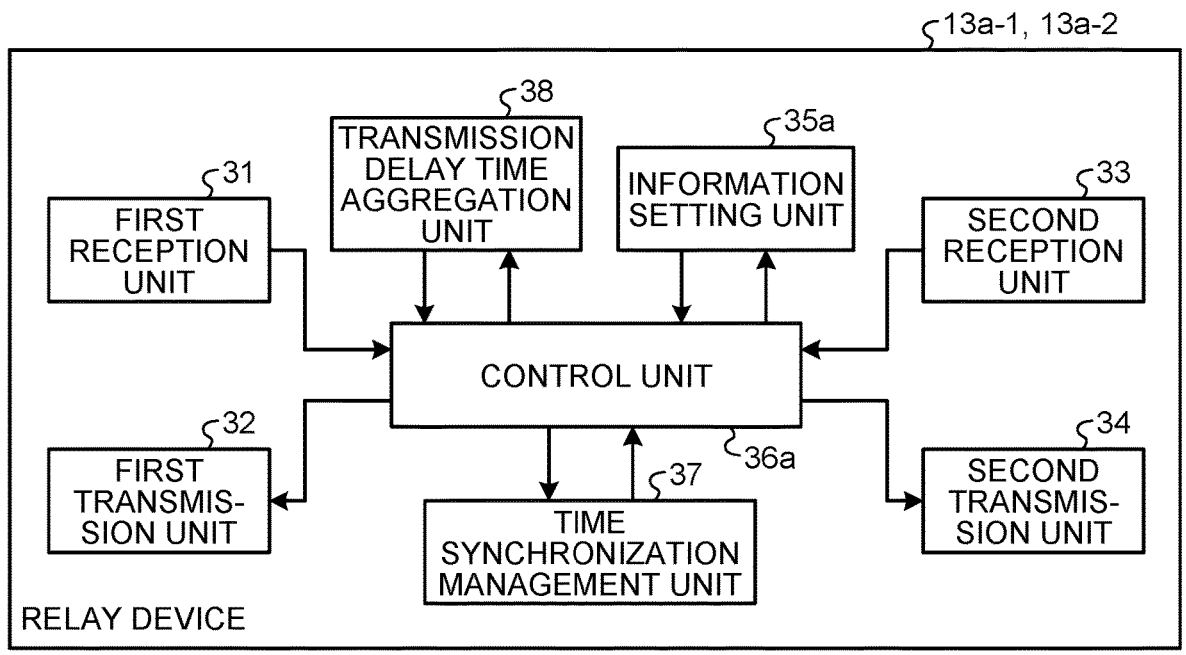
FIG. 14 is a diagram illustrating an example configuration of relay devices according to the second embodiment.

FIG. 14 is a diagram illustrating an example configuration of the relay devices 13a-1 and 13a-2 according to the second embodiment. The relay devices 13a-1 and 13a-2 are each configured to include an information setting unit 35a and a control unit 36a in place of the information setting unit 35 and the control unit 36 of the relay device 13-1 or 13-2 according to the first embodiment, and additionally include a transmission delay time aggregation unit 38. Description of the components other than the information setting unit 35a, the control unit 36a, and the transmission delay time aggregation unit 38 will be omitted.

The information setting unit 35a and the control unit 36a operate generally similarly to the information setting unit 35 and to the control unit 36 of each of the relay devices 13-1 and 13-2 according to the first embodiment, but some specific operations are different. Operations of the information setting unit 35a and of the control unit 36a will be described in detail later.

The transmission delay time aggregation unit 38 collects information about the transmission delay time caused to occur in the relay devices 13a-1 and 13a-2, and calculates the transmission delay time of frame caused to occur along the communication path from the master device 12 to the slave device 14a based on the information collected.

Figure 15:
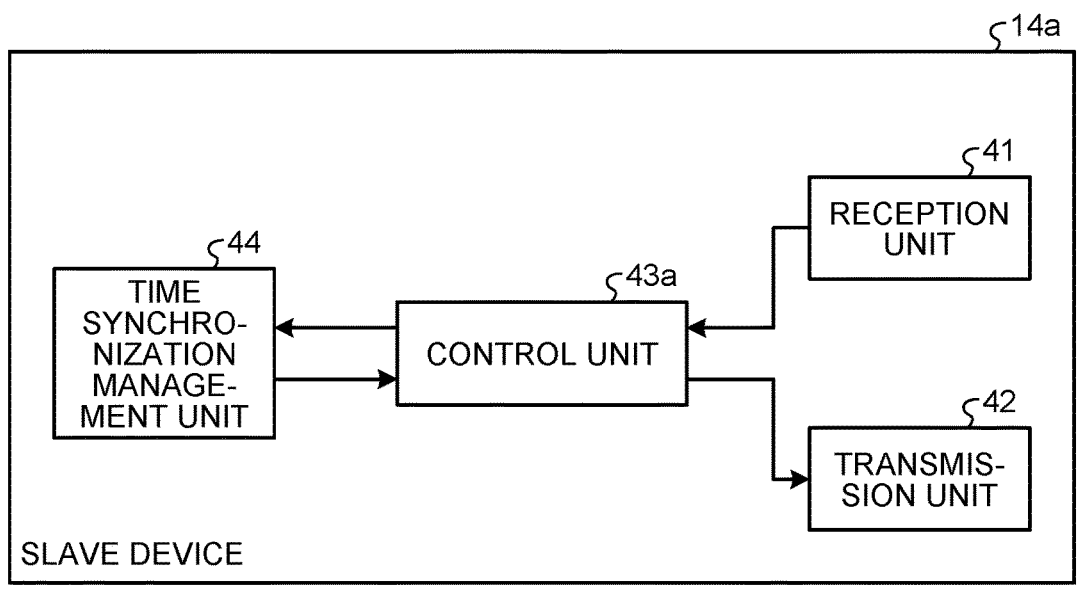
FIG. 15 is a diagram illustrating an example configuration of a slave device according to the second embodiment.

FIG. 15 is a diagram illustrating an example configuration of the slave device 14a according to the second embodiment. The slave device 14a is configured to have the transmission delay time aggregation unit 45 removed from the slave device 14 according to the first embodiment, and to include a control unit 43a in place of the control unit 43. Description of the components other than the control unit 43a will be omitted.

The control unit 43a operates generally similarly to the control unit 43 of the slave device 14 according to the first embodiment, but some specific operations are different. An operation of the control unit 43a will be described in detail later.

An operation of measuring the transmission delay time of a frame transmitted in the communication system 100a for each frame priority will next be described.

Figure 16:
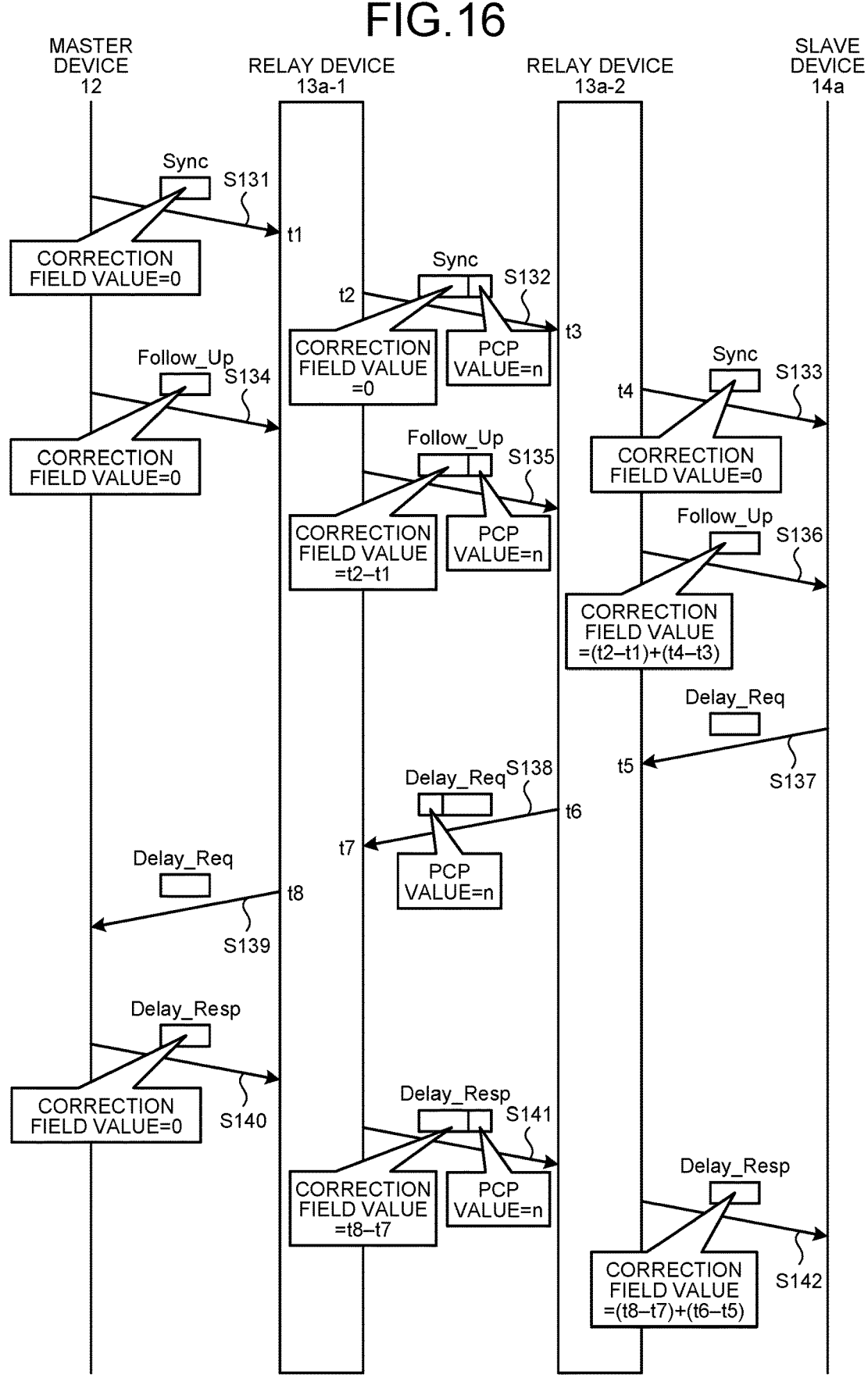
FIG. 16 is a sequence diagram illustrating an example of operation of measuring the transmission delay time of frame caused to occur in the communication system according to the second embodiment.

FIG. 16 is a sequence diagram illustrating an example of operation of measuring the transmission delay time of frame caused to occur in the communication system 100a according to the second embodiment.

As illustrated in FIG. 16, the communication system 100a also causes four types of PTP messages, i.e., a Sync message, a Follow_Up message, a Delay_Req message, and a Delay_Resp message, to be sent and received between the master device 12 and the slave device 14a similarly to the communication system 100 according to the first embodiment thus to measure the transmission delay time.

[Operation of Sending and Receiving Sync Message]

To send a Sync message, the master device 12 operates in such a manner that the time synchronization management unit 22 instructs the control unit 23 to generate a Sync message. In this operation, the time synchronization management unit 22 also notifies the control unit 23 of information about the structure of the frame to be used for sending the Sync message. This information is specifically information on an instruction to generate a frame having no VLAN tag, with the correction field value=0 and time=T1.

The control unit 23 that has received the instruction from the time synchronization management unit 22 generates a Sync message compliant to the instruction, and outputs the Sync message to the transmission unit 25. The transmission unit 25 sends the Sync message received from the control unit 23 to the relay device 13a-1 (step S131 of FIG. 16).

When the Sync message sent from the master device 12 arrives at the relay device 13a-1, the relay device 13a-1 adds a VLAN tag in which a PCP value has been set, to the frame storing the Sync message, and transfers the resulting frame to the relay device 13a-2 (step S132 of FIG. 16). Although the PCP value may be set to any value within a settable range, an example will be described below, by way of example, in which the PCP value in the frame is set to "7". Operations of sending and receiving a Follow_Up message, a Delay_Req message, and a Delay_Resp message will be described later also assuming that the PCP value in the frame is set to "7". Note that FIG. 16 illustrates the PCP value as "n" to generalize the description.

An operation of the relay device 13a-1 to transfer the frame storing a Sync message will next be described.

Figure 17:
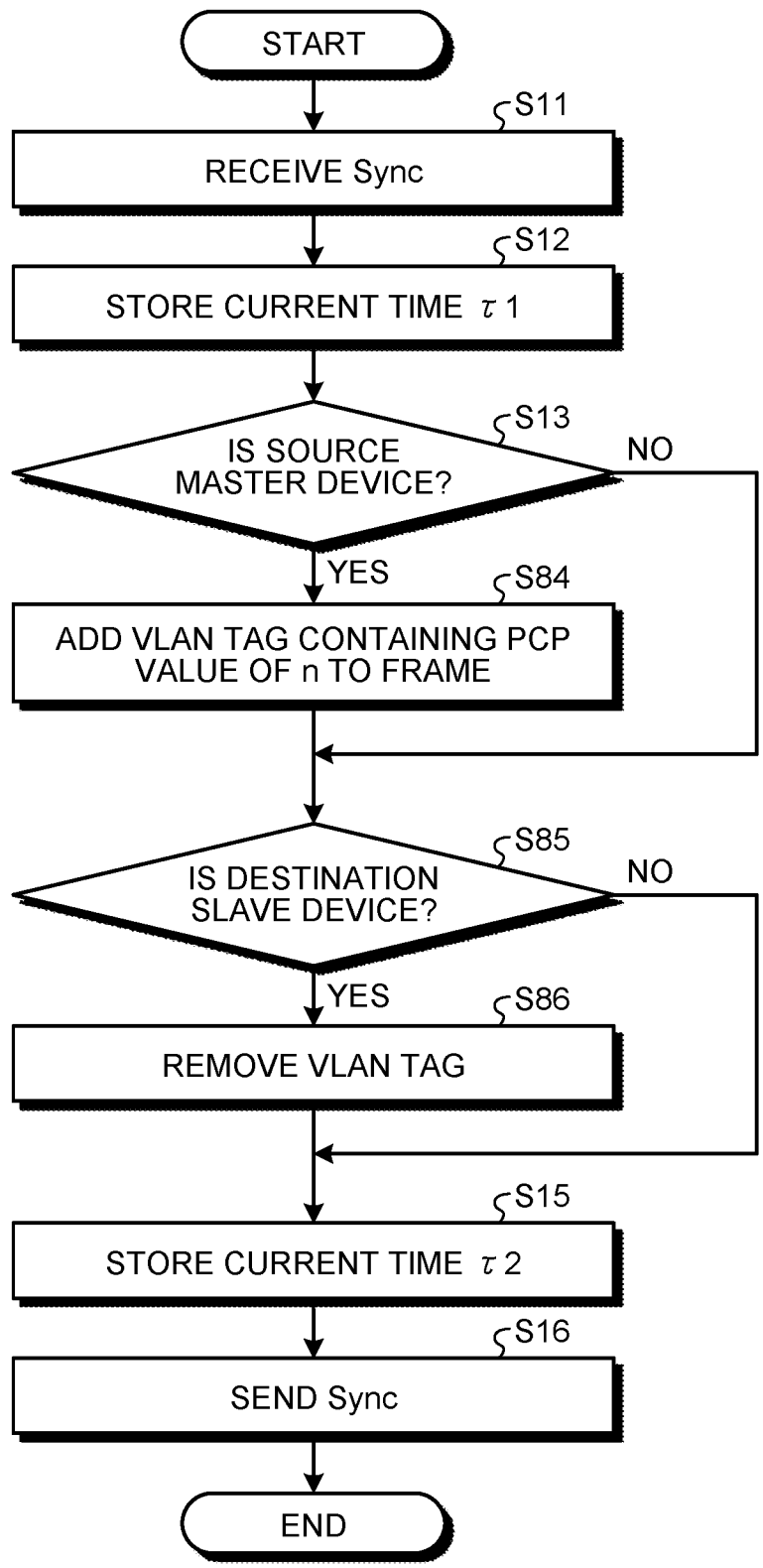
FIG. 17 is a flowchart illustrating an example of operation of relaying a Sync message performed by the relay devices according to the second embodiment.

FIG. 17 is a flowchart illustrating an example of operation of relaying a Sync message performed by the relay devices 13a-1 according to the second embodiment. Note that an example of operation of relaying a Sync message performed by the relay device 13a-2 is also illustrated by the flowchart of FIG. 17.

FIG. 17 uses the same step numbers as the step numbers of the operation in common assigned in the flowchart of FIG. 8 illustrating an example operation of the relay devices 13-1 and 13-2 according to the first embodiment.

In the relay device 13a-1, the first reception unit 31 receives the Sync message (step S11), and the time synchronization management unit 37 stores a current time 11 as the time of reception of the Sync message (step S12). In the example illustrated in FIG. 16, the first reception unit 31 of the relay device 13a-1 receives the Sync message at time t1. The time synchronization management unit 37 thus stores $1l$=t1 at step S12.

Next, the information setting unit 35a checks whether the source of the Sync message is the master device 12 (step S13). When the source is not the master device 12, that is, when the source is the other relay device (step S13: No), the process proceeds to step S85.

Alternatively, when the source of the Sync message is the master device 12 (step S13: Yes), the information setting unit 35a adds a VLAN tag containing a PCP value of "7" to the frame storing the Sync message (step S84). In the case of the relay device 13a-1, the source of the Sync message is the master device 12, and the relay device 13a-1 thus performs step S84 after step S13 to cause the information setting unit 35a to add, to the frame, a VLAN tag containing a PCP value of "7". Note that when the PCP value is to be set to a value other than "7", the relay devices 13a-1 and 13a-2 also follow an operational flow identical to the operational flow to set the PCP value to "7". Thus, FIG. 17 illustrates the PCP value to be set, as "n", to generalize the description.

When the source of the Sync message is not the master device 12 (step S13: No), or when a VLAN tag has been added to the frame at step S84, the information setting unit 35a checks whether the destination of the Sync message is the slave device 14a (step S85). The term destination as used in this context refers to the device to which the Sync message is sent. Thus, the relay device 13a-2 is the destination in the case of the relay device 13a-1, while the slave device 14a is the destination in the case of the relay device 13a-2. When the destination is not the slave device 14a, that is, when the destination is the other relay device (step S85: No), the process proceeds to step S15. Alternatively, when the destination of the Sync message is the slave device 14a (step 385: Yes), the information setting unit 35a removes the VLAN tag from the frame storing the Sync message (step S86).

When the destination of the Sync message is not the slave device 14a (step 385: No), or when the VLAN tag has been removed at step S86, the time synchronization management unit 37 stores a current time t2 as the time of sending of the Sync message (step S15), and the second transmission unit 34 sends the Sync message (step S16). The process then terminates. In the case of the relay device 13a-1, the destination of the Sync message is not the slave device 14a, and the process thus proceeds to step S15 after step S85. In the example illustrated in FIG. 16, the second transmission unit 34 of the relay device 13a-1 sends the Sync message at time t2. The time synchronization management unit 37 of the relay device 13a-1 thus stores τ2=t2 at step S15.

When the Sync message sent from the relay device 13a-1 arrives at the relay device 13a-2, the relay device 13a-2 removes the VLAN tag from the frame storing the Sync message, and transfers the resulting frame to the slave device 14a (step S133 of FIG. 16). An operation of the relay device 13a-2 to perform this process will next be described.

When the Sync message arrives from the relay device 13a-1, the relay device 13a-2 performs operations of steps S11 to S13, S85, S86, S15, and S16 of FIG. 17. That is, the relay device 13a-2 operates in such a manner that the first reception unit 31 receives the Sync message, the time synchronization management unit 37 stores the current time it of reception of the Sync message, and the information setting unit 35a removes the VLAN tag from the frame storing the Sync message. Then, the time synchronization management unit 37 stores the current time τ2 of sending of the Sync message, and the second transmission unit 34 sends the Sync message. In the example illustrated in FIG. 16, the relay device 13a-2 receives the Sync message at time t3, and sends the Sync message at time t4. Accordingly, the time synchronization management unit 37 of the relay device 13a-2 stores τ1=t3 as the time of reception of the Sync message, and stores τ2=t4 as the time of sending of the Sync message.

When the Sync message sent from the relay device 13a-2 arrives at the slave device 14a, the slave device 14a stores the time of reception of the Sync message. Specifically, in the slave device 14a, the reception unit 41 receives the Sync message, and the control unit 43a notifies the time synchronization management unit 44 of reception of the Sync message. The time synchronization management unit 44 stores as T2 the time indicated by the internal clock upon reception of the notification from the control unit 43a, i.e., the time of reception of the Sync message. In addition, the time synchronization management unit 44 stores the value of T1 given in the Sync message. As described above, T1 represents the time when the master device 12 sent the Sync frame.

[Operation of Sending and Receiving Follow_Up Message]

To send a Follow_Up message, the master device 12 operates in such a manner that the time synchronization management unit 22 instructs the control unit 23 to generate a Follow_Up message. In this operation, the time synchronization management unit 22 also notifies the control unit 23 of information about the structure of the frame to be used for sending the Follow_Up message. This information is specifically information on an instruction to generate a frame having no VLAN tag, with the correction field value=0.

The control unit 23 that has received the instruction from the time synchronization management unit 22 generates a Follow_Up message compliant to the instruction, and outputs the Follow_Up message to the transmission unit 25. The transmission unit 25 sends the Follow_Up message received from the control unit 23 to the relay device 13a-1 (step S134 of FIG. 16).

When the Follow_Up message sent from the master device 12 arrives at the relay device 13a-1, the relay device 13a-1 updates the correction field value in the Follow_Up message, adds a VLAN tag in which a PCP value has been set, to the frame storing the Follow_Up message, and transfers the resulting frame to the relay device 13a-2 (step S135 of FIG. 16). An operation of the relay device 13a-1 to perform this process will next be described.

Figure 18:
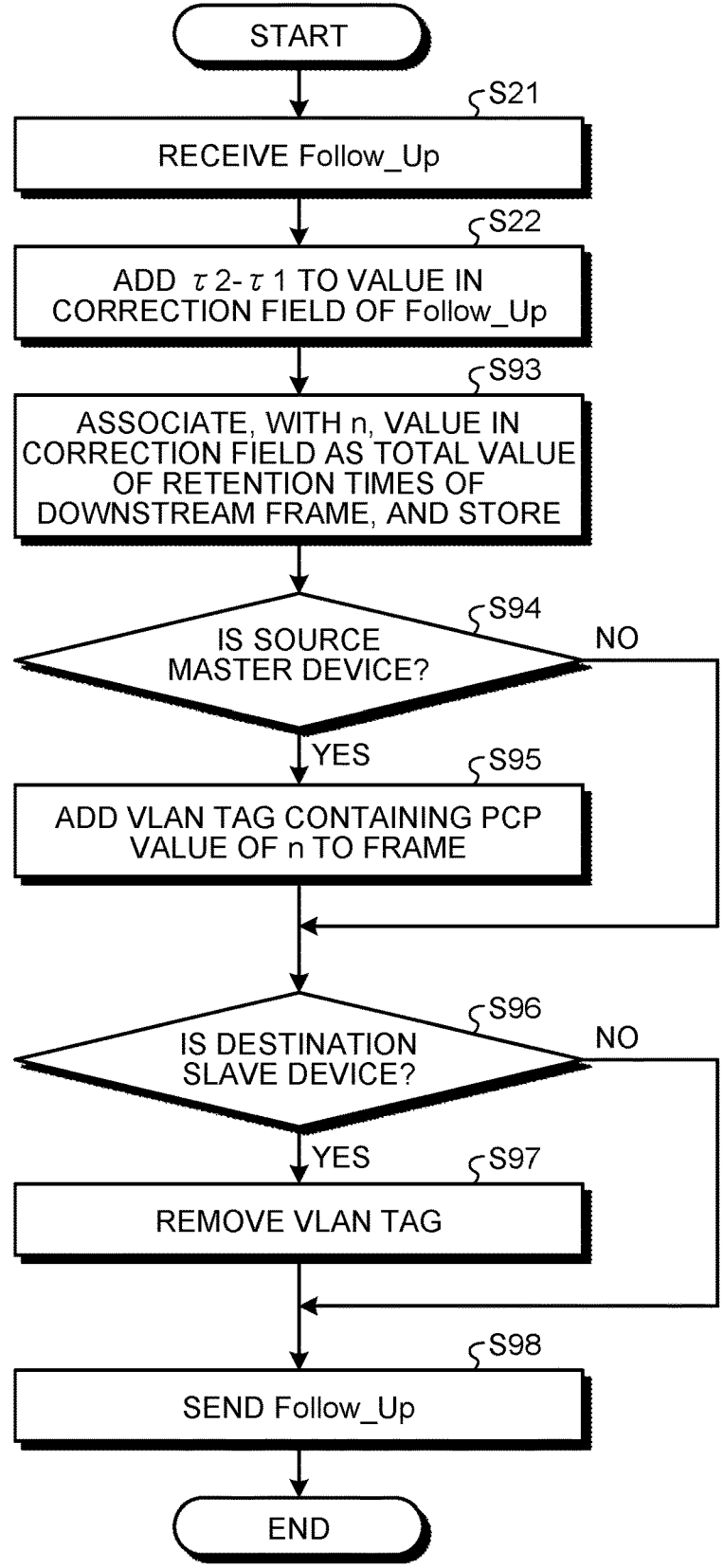
FIG. 18 is a flowchart illustrating an example of operation of relaying a Follow_Up message performed by the relay devices according to the second embodiment.

FIG. 18 is a flowchart illustrating an example of operation of relaying a Follow_Up message performed by the relay devices 13a-1 according to the second embodiment. Note that an example of operation of relaying a Follow_Up message performed by the relay device 13a-2 is also illustrated by the flowchart of FIG. 18.

FIG. 18 uses the same step numbers as the step numbers of the operation in common assigned in the flowchart of FIG. 9 illustrating an example operation of the relay devices 13-1 and 13-2 according to the first embodiment.

In the relay device 13a-1, the first reception unit 31 receives the Follow_Up message (step S21), and the time synchronization management unit 37 adds the retention time (τ2−τ1) of the Sync message caused to occur during relaying of the Sync message, to the value in the correction field of the Follow_Up message (step S22). In the example illustrated in FIG. 16, the relay device 13a-1 undergoes a retention time of the Sync message equal to t2−t1. Thus, at step S22, the time synchronization management unit 37 adds a value of t2−t1 to the value in the correction field.

Next, the transmission delay time aggregation unit 38 associates, with the PCP value (n=7) in the VLAN tag, the value in the correction field (t2−t1) of the Follow_Up message as the total value of the retention time of a downstream frame, and stores these values in association (step S93). Note that when the PCP value is to be set to a value other than "7", the relay devices 13*a*-1 and 13*a*-2 also follow an operational flow identical to the operational flow to set the PCP value to "7". Thus, FIG. 18 illustrates the PCP value in the VLAN tag as "n" to generalize the description.

Next, the information setting unit 35*a* checks whether the source of the Follow_Up message is the master device 12 (step S94). When the source is not the master device 12, that is, when the source is the other relay device (step S94: No), the process proceeds to step S96. Alternatively, when the source of the Follow_Up message is the master device 12 (step S94: Yes), the information setting unit 35*a* adds a VLAN tag containing a PCP value of "7" to the frame storing the Follow_Up message (step S95). In the case of the relay device 13*a*-1, the source of the Follow_Up message is the master device 12, and the relay device 13*a*-1 thus performs step S95 after step S94 to cause the information setting unit 35*a* to add, to the frame, a VLAN tag containing a PCP value of "7".

When the source of the Follow_Up message is not the master device 12 (step S94: No), or when a VLAN tag has been added to the frame at step S95, the information setting unit 35*a* checks whether the destination of the Follow_Up message is the slave device 14*a* (step S96). The term destination as used in this context refers to, similarly to the destination of the Sync message described above, the device to which the Follow_Up message is sent. When the destination is not the slave device 14*a*, that is, when the destination is the other relay device (step S96: No), the process proceeds to step S98. Alternatively, when the destination of the Follow_Up message is the slave device 14*a* (step S96: Yes), the information setting unit 35*a* removes the VLAN tag from the frame storing the Follow_Up message (step S97). In the case of the relay device 13*a*-1, the destination of the Follow_Up message is not the slave device 14*a*, and the process thus proceeds to step S98 after step 396.

When the destination of the Follow_Up message is not the slave device 14*a* (step S96: No), or when the VLAN tag has been removed from the frame at step 397, the second transmission unit 34 sends the Follow_Up message (step S98). The process then terminates. In the case of the relay device 13*a*-1, step 397 is not performed, and the second transmission unit 34 sends, at step S98, the Follow_Up message to the relay device 13*a*-2.

When the Follow_Up message sent from the relay device 13*a*-1 arrives at the relay device 13*a*-2, the relay device 13*a*-2 updates the correction field value in the Follow_Up message, removes the VLAN tag from the Follow_Up message, and transfers the resulting frame to the slave device 14*a* (step S136 of FIG. 16). An operation of the relay device 13*a*-2 to perform this process will next be described.

When the Follow_Up message arrives from the relay device 13*a*-1, the relay device 13*a*-2 performs operations of steps S21, S22, S93, S94, and S96 to S98 of FIG. 18. That is, the relay device 13*a*-2 operates in such a manner that the first reception unit 31 receives the Follow_Up message, and the time synchronization management unit 37 adds the retention time (τ2−τ1) of the Sync message to the correction field value of the Follow_Up message. In the example illustrated in FIG. 16, the relay device 13*a*-2 undergoes a retention time of the Sync message equal to t4−t3. Thus, the time synchronization management unit 37 adds a value of t4−t3 to the value in the correction field. Next, the transmission delay time aggregation unit 38 associates, with the PCP value (n=7), the correction field value ((t2−t1)+(t4−t3)) of the Follow_Up message as the total value of the retention times of a downstream frame, and stores these values in association. Then, the information setting unit 35*a* removes the VLAN tag from the Follow_Up message, and the second transmission unit 34 sends the Follow_Up message to the slave device 14*a*.

When the Follow_Up message sent from the relay device 13*a*-2 arrives at the slave device 14*a*, the reception unit 41 receives the Follow_Up message.

[Operation of Sending and Receiving Delay_Req Message]

To send a Delay_Req message, the slave device 14*a* operates in such a manner that the time synchronization management unit 44 instructs the control unit 43*a* to generate a Delay_Req message. In this operation, the time synchronization management unit 44 also notifies the control unit 43*a* of information about the structure of the frame to be used for sending the Delay_Req message. This information is specifically information on an instruction to generate a frame having no VLAN tag. In addition, the time synchronization management unit 44 stores time T3, which is indicated by the internal clock at the time of issuing the instruction to the control unit 43*a* to generate the Delay_Req message.

The control unit 43*a* that has received the instruction from the time synchronization management unit 44 generates a Delay_Req message compliant to the instruction, and outputs the Delay_Req message to the transmission unit 42. The transmission unit 42 sends the Delay_Req message received from the control unit 43*a* to the relay device 13*a*-2 (step S137 of FIG. 16).

When the Delay_Req message sent from the slave device 14*a* arrives at the relay device 13*a*-2, the relay device 13*a*-2 adds a VLAN tag in which a PCP value has been set, to the frame storing the Delay_Req message, and transfers the resulting frame to the relay device 13*a*-1 (step S138 of FIG. 16). An operation of the relay device 13*a*-2 to perform this process will next be described.

Figure 19:
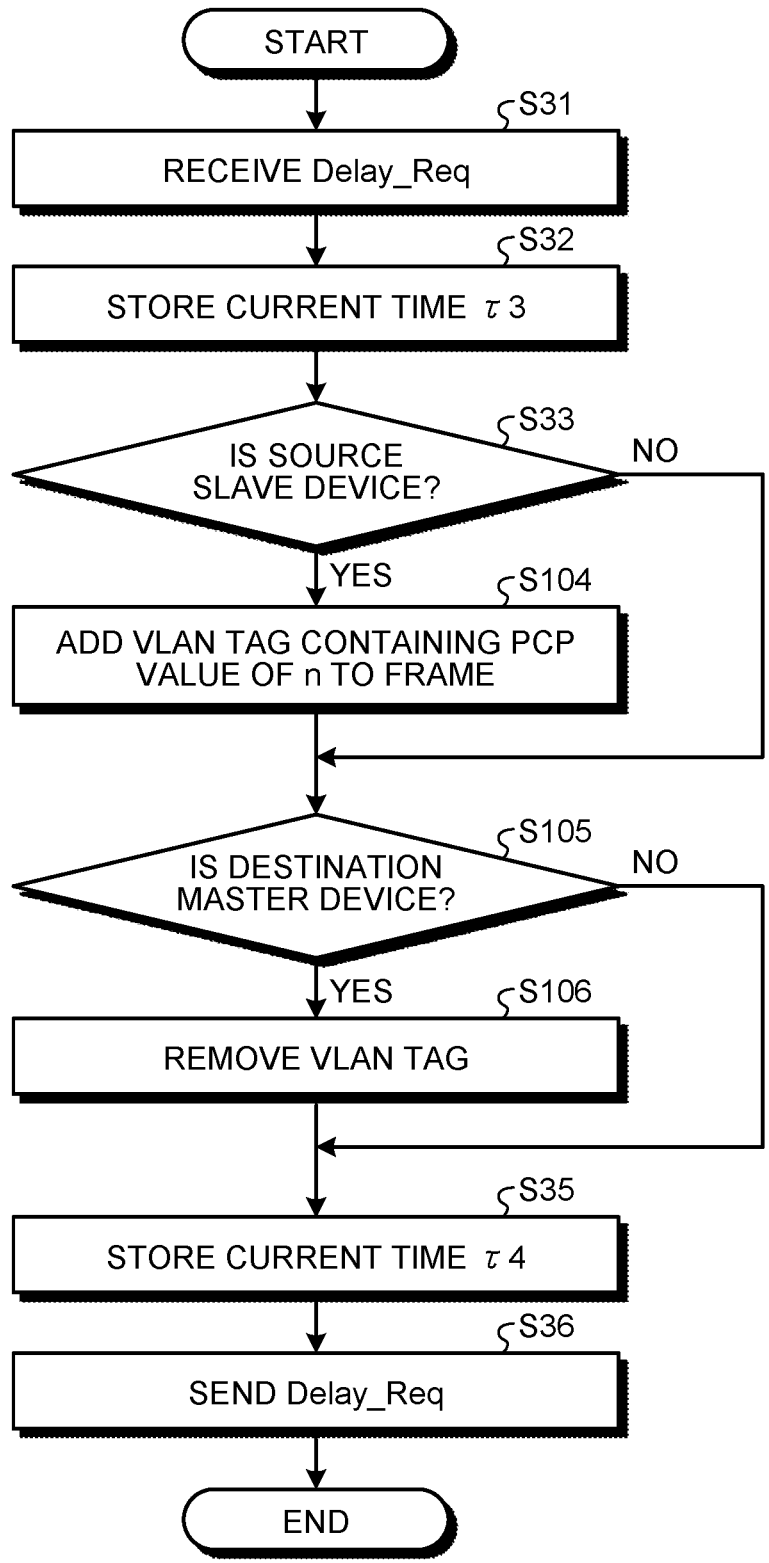
FIG. 19 is a flowchart illustrating an example of operation of relaying a Delay_Req message performed by the relay devices according to the second embodiment.

FIG. 19 is a flowchart illustrating an example of operation of relaying a Delay_Req message performed by the relay devices 13*a*-2 according to the second embodiment. Note that an example of operation of relaying a Delay_Req message performed by the relay device 13*a*-1 is also illustrated by the flowchart of FIG. 19.

FIG. 19 uses the same step numbers as the step numbers of the operation in common assigned in the flowchart of FIG. 10 illustrating an example operation of the relay devices 13-1 and 13-2 according to the first embodiment.

In the relay device 13*a*-2, the second reception unit 33 receives the Delay_Req message (step S31), and the time synchronization management unit 37 stores a current time 13 as the time of reception of the Delay_Req message (step S32). In the example illustrated in FIG. 16, the second reception unit 33 of the relay device 13*a*-2 receives the Sync message at time t5. The time synchronization management unit 37 thus stores τ3=t5 at step S32.

Next, the information setting unit 35*a* checks whether the source of the Delay_Req message is the slave device 14*a* (step S33). When the source is not the slave device 14*a*, that is, when the source is the other relay device (step S33: No), the process proceeds to step S105. Alternatively, when the source of the Delay_Req message is the slave device 14*a* (step S33: Yes), the information setting unit 35*a* adds a VLAN tag containing a PCP value of "7" to the frame storing the Delay_Req message (step S104). In the case of the relay device 13*a*-2, the source of the Delay_Req message is the slave device 14*a*, and the relay device 13*a*-2 thus performs step S104 after step S33 to cause the information setting unit 35*a* to add a VLAN tag containing a PCP value of "7" to the frame. Note that when the PCP value is to be set to a value other than "7", the relay devices 13a-1 and 13a-2 also follow an operational flow identical to the operational flow to set the PCP value to "7". Thus, FIG. 19 illustrates the PCP value in the VLAN tag as "n" to generalize the description.

When the source of the Delay_Req message is not the slave device 14a (step S33: No), or when a VLAN tag has been added to the frame at step S104, the information setting unit 35a checks whether the destination of the Delay_Req message is the master device 12 (step S105). The term destination as used in this context refers to, similarly to the destination of the Sync message described above, the device to which the Delay_Req message is sent. The relay device 13a-1 is the destination in the case of the relay device 13a-2, while the master device 12 is the destination in the case of the relay device 13a-1. When the destination is not the master device 12 (step S105: No), the process proceeds to step S35. Alternatively, when the destination of the Delay_Req message is the master device 12 (step S105: Yes), the information setting unit 35a removes the VLAN tag from the frame storing the Delay_Req message (step S106). In the case of the relay device 13a-2, the destination of the Delay_Req message is not the master device 12, and the process thus proceeds to step S35 after step S105.

When the destination of the Delay_Req message is not the master device 12 (step S105: No), or when the VLAN tag has been removed from the frame at step S106, the time synchronization management unit 37 stores a current time 14 as the time of sending of the Delay_Req message (step S35), and the first transmission unit 32 sends the Delay_Req message (step S36). The process then terminates. The first transmission unit 32 of the relay device 13a-2 sends the Delay_Req message to the relay device 13a-1 at step S36. In the example illustrated in FIG. 16, the first transmission unit 32 of the relay device 13a-2 sends the Delay_Req message at time t6. The time synchronization management unit 37 thus stores τ4=t6 at step S35.

When the Delay_Req message sent from the relay device 13a-2 arrives at the relay device 13a-1, the relay device 13a-1 removes the VLAN tag from the Delay_Req message, and transfers the resulting frame to the master device 12 (step S139 of FIG. 16). An operation of the relay device 13a-1 to perform this process will next be described.

When the Delay_Req message arrives from the relay device 13a-2, the relay device 13a-1 performs operations of steps S31 to S33, S105, S106, S35, and S36 of FIG. 19. That is, the relay device 13a-1 operates in such a manner that the second reception unit 33 receives the Delay_Req message, and the time synchronization management unit 37 stores the current time 13 of reception of the Delay_Req message. Next, the information setting unit 35a removes the VLAN tag from the Delay_Req message, the time synchronization management unit 37 stores the current time T4 of sending of the Delay_Req message, and the first transmission unit 32 sends the Delay_Req message. In the example illustrated in FIG. 16, the relay device 13a-1 receives the Delay_Req message at time t7, and sends the Delay_Req message at time t8. Accordingly, the time synchronization management unit 37 of the relay device 13a-1 stores τ3=t7 as the time of reception of the Delay_Req message, and stores τ4=t8 as the time of sending of the Delay_Req message.

When the Delay_Req message sent from the relay device 13a-1 arrives at the master device 12, the master device 12 stores the time of reception of the Delay_Req message. Specifically, in the master device 12, the reception unit 24 receives the Delay_Req message, and the control unit 23 notifies the time synchronization management unit 22 of reception of the Delay_Req message. The time synchronization management unit 22 stores as T4 the time indicated by the internal clock upon reception of the notification from the control unit 23, i.e., the time of reception of the Delay_Req message.

[Operation of Sending and Receiving Delay_Resp Message]

To send a Delay_Resp message, the master device 12 operates in such a manner that the time synchronization management unit 22 instructs the control unit 23 to generate a Delay_Resp message. In this operation, the time synchronization management unit 22 also notifies the control unit 23 of information about the structure of the frame to be used for sending the Delay_Resp message. This information is specifically information on an instruction to generate a frame having no VLAN tag, with the correction field value=0 and time T4.

The control unit 23 that has received the instruction from the time synchronization management unit 22 generates a Delay_Resp message compliant to the instruction, and outputs the Delay_Resp message to the transmission unit 25. The transmission unit 25 sends the Delay_Resp message received from the control unit 23 to the relay device 13a-1 (step S140 of FIG. 16).

When the Delay_Resp message sent from the master device 12 arrives at the relay device 13a-1, the relay device 13a-1 updates the correction field value in the Delay_Resp message, adds a VLAN tag in which a PCP value has been set, to the frame storing the Delay_Resp message, and transfers the resulting frame to the relay device 13a-2 (step S141 of FIG. 16). An operation of the relay device 13a-1 to perform this process will next be described.

Figure 20:
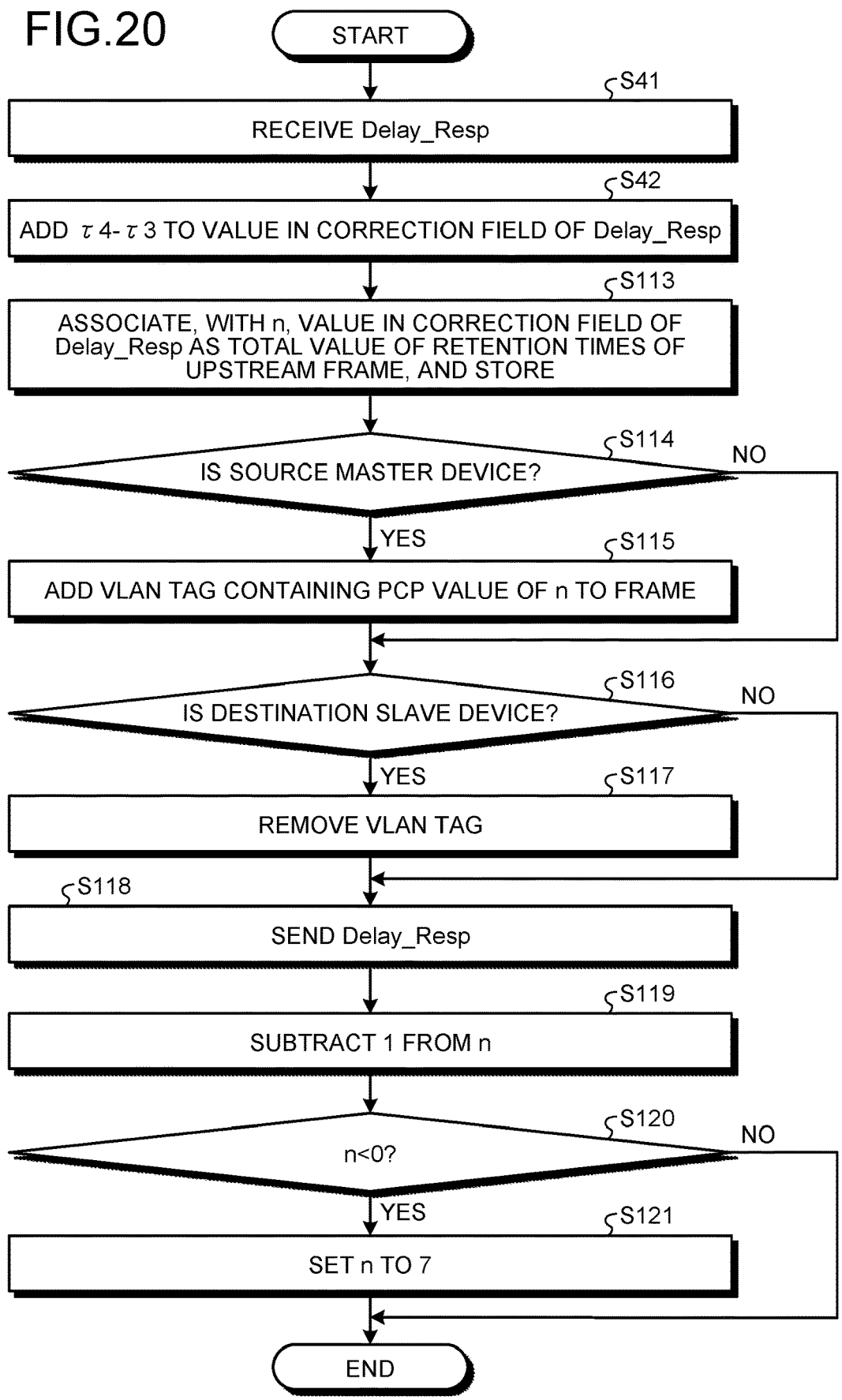
FIG. 20 is a flowchart illustrating an example of operation of relaying a Delay_Resp message performed by the relay devices according to the second embodiment.

FIG. 20 is a flowchart illustrating an example of operation of relaying a Delay_Resp message performed by the relay device 13a-1 according to the second embodiment. Note that an example of operation of relaying a Delay_Resp message performed by the relay device 13a-2 is also illustrated by the flowchart of FIG. 20.

In the relay device 13a-1, the first reception unit 31 receives the Delay_Resp message (step S41), and the time synchronization management unit 37 adds the retention time (τ4−τ3) of the Delay_Req message caused to occur during relaying of the Delay_Req message, to the value in the correction field of the Delay_Resp message (step S42). In the example illustrated in FIG. 16, the relay device 13a-1 undergoes a retention time of the Delay_Req message equal to t8−t7. Thus, at step S42, the time synchronization management unit 37 adds a value of t8−t7 to the value in the correction field.

Next, the time synchronization management unit 37 associates, with the PCP value (n=7) in the VLAN tag, the value in the correction field (t8−t7) of the Delay_Resp message as the total value of the retention time of an upstream frame, and stores these values in association (step S113). Note that when the PCP value is to be set to a value other than "7", the relay devices 13a-1 and 13a-2 also follow an operational flow identical to the operational flow to set the PCP value to "7". Thus, FIG. 20 illustrates the PCP value in the VLAN tag as "n" to generalize the description.

Next, the information setting unit 35a checks whether the source of the Delay_Resp message is the master device 12 (step S114). When the source is not the master device 12, that is, when the source is the other relay device (step S114: No), the process proceeds to step S116. Alternatively, when the source of the Delay_Resp message is the master device 12 (step S114: Yes), the information setting unit 35a adds a VLAN tag containing a PCP value of "7" to the frame storing the Delay_Resp message (step S115). In the case of the relay device 13a-1, the source of the Delay_Resp message is the master device 12, and the relay device 13a-1 thus performs step S115 after step S114 to cause the information setting unit 35a to add, to the frame, a VLAN tag containing a PCP value of "7".

When the source of the Delay_Resp message is not the master device 12 (step S114: No), or when a VLAN tag has been added to the frame at step S115, the information setting unit 35a checks whether the destination of the Delay_Resp message is the slave device 14a (step S116). The term destination as used in this context refers to, similarly to the destination of the Sync message described above, the device to which the Delay_Resp message is sent. When the destination is not the slave device 14a, that is, when the destination is the other relay device (step S116: No), the process proceeds to step S118. Alternatively, when the destination of the Delay_Resp message is the slave device 14a (step S116: Yes), the information setting unit 35a removes the VLAN tag from the frame storing the Delay_Resp message (step S117). In the case of the relay device 13a-1, the destination of the Delay_Resp message is not the slave device 14a, and the process thus proceeds to step S118 after step S116.

When the destination of the Delay_Resp message is not the slave device 14a (step S116: No), or when the VLAN tag has been removed from the frame at step S117, the second transmission unit 34 sends the Delay_Resp message (step S118). The second transmission unit 34 of the relay device 13a-1 sends the Delay_Resp message to the relay device 13a-2 at step S118.

Next, the information setting unit 35a subtracts "1" from the PCP value (n) (step S119). When the value of n resulting from subtraction of "1" is not less than 0 (step S120: No), the process terminates. When the value of n resulting from subtraction of "1" is less than 0 (step S120: Yes), the information setting unit 35a changes the value of n to "7" (step S121), and the process then terminates. Since this example assumes that the PCP value=7, the relay device 13a-1 terminates the process without performing step S121.

When the Delay_Resp message sent from the relay device 13a-1 arrives at the relay device 13a-2, the relay device 13a-2 updates the correction field value in the Delay_Resp message, removes the VLAN tag from the Delay_Resp message, and transfers the resulting frame to the slave device 14a (step S142 of FIG. 16). An operation of the relay device 13a-2 to perform this process will next be described.

When the Delay_Resp message arrives from the relay device 13a-1, the relay device 13a-2 performs operations of steps S41, S42, S113, S114, and S116 to S120 of FIG. 20. That is, the relay device 13a-2 operates in such a manner that the first reception unit 31 receives the Delay_Resp message, and the time synchronization management unit 37 adds the retention time (τ4−τ3) of the Delay_Req message to the correction field value of the Delay_Resp message. In the example illustrated in FIG. 16, the relay device 13a-2 undergoes a retention time of the Delay_Req message equal to t6−t5. Thus, the time synchronization management unit 37 adds a value of t6−t5 to the value in the correction field. Next, the time synchronization management unit 37 associates, with the PCP value (n=7), the correction field value ((t8−t7)+(t6−t5)) of the Delay_Resp message as the total value of the retention times of an upstream frame, and stores these values in association. Then, the information setting unit 35a removes the VLAN tag from the Delay_Resp message, and the second transmission unit 34 sends the Delay_Resp message to the slave device 14a. In addition, the information setting unit 35a subtracts "1" from the PCP value (n).

When the Delay_Resp message sent from the relay device 13a-2 arrives at the slave device 14a, the slave device 14a stores the value in the correction field and time information (T4) given in the Delay_Resp message. Specifically, in the slave device 14a, the reception unit 41 receives the Delay_Resp message, and the control unit 43a notifies the time synchronization management unit 44 of reception of the Delay_Resp message. The time synchronization management unit 44 stores the value in the correction field ((t8−t7)+(t6−t5)) and time information (T4) given in the Delay_Resp message.

Performing the foregoing operations of sending and receiving a Sync message, a Follow_Up message, a Delay_Req message, and a Delay_Resp message enables an average path delay to be calculated. The average path delay is the transmission delay along the communication path from the master device 12 to the slave device 14a.

The average path delay is calculated in the time synchronization management unit 44 of the slave device 14a. The average path delay is calculated in a similar manner to the first embodiment. In addition, the time synchronization management unit 44 calculates a slave device time difference using the average path delay. The slave device time difference is the offset of the time in the slave device 14a with respect to the time in the master device 12. The slave device time difference is calculated in a similar manner to the first embodiment.

The transmission delay time aggregation unit 38 of the relay device 13a-2 adjacent to the slave device 14a thus stores the total value of the retention times ((t2−t1)+(t4−t3)) of the respective relay devices 13a-1 and 13a-2 of a downstream frame when the PCP value=7, and the total value of the retention times ((t8−t7)+(t6−t5)) of the respective relay devices 13a-1 and 13a-2 of an upstream frame when the PCP value=7.

By performing the above series of operations while changing the PCP value to be set in transferring a frame by the relay device 13a-1 or 13a-2, the transmission delay time aggregation unit 38 of the relay device 13a-2 can calculate and store, for each PCP value, the transmission delay time of frame in each of the upstream direction and downstream direction.

The above series of operations may be repeatedly performed while changing the PCP value from 0 to 7 (in ascending order) or at random for queuing a corresponding task to a measurement queue.

In addition, the above series of operations may be performed to assign a PCP value to the Sync message and to the Delay_Resp message in different orders. In this process, the Follow_Up message is given (assigned) a PCP value identical to the PCP value that has been set in the Sync message immediately before, and the Delay_Resp message is given (assigned) a PCP value identical to the PCP value that has been set in the Delay_Req message immediately before.

Measurement may be performed multiple times for a single PCP value. When measurement is performed multiple times, the representative value of the results of the multiple measurements may be an average value, a maximum value, or a minimum value of the results, or a weighted average obtained by using a greater or less weight for a more recent measurement result.

The transmission delay time in the above series of operations may be associated with another element (e.g., the ToS value in the IPv4 header, Traffic Class in the IPv6 header, the frame length, the payload content of the frame, or the like) that indicates a characteristic of the frame, in place of, or in addition to, the PCP value in the VLAN tag. Also in such case, a similar result (the transmission delay time of frame in each of the upstream direction and downstream direction) is obtainable.

Each of the PTP messages has an extension field, and when each of the PTP messages is sent from a relay device, the relay device may set the retention time of that relay device in this extension field, and then send the resulting PTP message. Such operation allows the master device, the other relay device, the slave device, or another device connected to that relay device to be notified of not only the total value of the retention times but also the retention time in each of the relay devices.

The configuration described in connection with the present embodiment is also advantageous in a similar manner to the first embodiment.

A communication system according to the present disclosure is advantageous in capability of measuring a transmission delay time of frame for each priority level without using a dedicated frame.

The configurations described in the foregoing embodiments are merely examples. These configurations may be combined with a known other technology, and configurations of different embodiments may be combined together. Moreover, part of the configurations may be omitted and/or modified without departing from the spirit thereof.

What is claimed is:

1. A communication system comprising:
a master device;
a slave device to time-synchronize with the master device; and
a relay device to relay a signal between the master device and the slave device, wherein
the relay device includes
information setting circuitry to sets, in a frame, characteristic information about priority of the frame, the frame being received from either the master device or the slave device, and
time synchronization management circuitry to store a retention time of a first time-synchronization frame caused to occur during relaying of the first time-synchronization frame, to add the retention time of the first time-synchronization frame being stored to a correction field of a second time-synchronization frame and write the retention time of the first time-synchronization frame being stored into the second time-synchronization frame as a device-specific retention time when the second time-synchronization frame is relayed, to store a retention time of a third time-synchronization frame caused to occur during relaying of the third time-synchronization frame, and to add the retention time of the third time-synchronization frame being stored to a correction field of a fourth time-synchronization frame and write the retention time of the third time-synchronization frame being stored into the fourth time-synchronization frame as a device-specific retention time when the fourth time-synchronization frame is relayed, the first time-synchronization frame being a frame sent from the master device to the slave device, the second time-synchronization frame being a frame sent from the master device to the slave device, the third time-synchronization frame being a frame sent from the slave device to the master device, the fourth time-synchronization frame being a frame sent from the master device to the slave device,
the slave device includes
transmission delay time aggregation circuitry to associate a value in the correction field of the second time-synchronization frame received from the relay device, with characteristic information set in the second time-synchronization frame, and store the value and the characteristic information of the second time-synchronization frame in association, and to associate a value in the correction field of the fourth time-synchronization frame received from the relay device, with characteristic information set in the fourth time-synchronization frame, and store the value and the characteristic information of the fourth time-synchronization frame in association, and
the slave device notifies another device connected, of a device-specific retention time written in the second time-synchronization frame received from the relay device and of a device-specific retention time written in the fourth time-synchronization frame received from the relay device.

2. The communication system according to claim 1, wherein
the information setting circuitry sets the characteristic information in a tag added to the frame received from either the master device or the slave device.

3. The communication system according to claim 1, wherein
the information setting circuitry adds a tag in which the characteristic information is set, to the frame received from either the master device or the slave device, and removes the tag from a frame to be sent to either the master device or the slave device.

4. The communication system according to claim 1, wherein the characteristic information represents a priority level of a frame.

5. The communication system according to claim 4, wherein the priority level is a priority code point (PCP) value in a virtual local area network (VLAN) tag.

6. The communication system according to claim 4, wherein the priority level is a type of service (ToS) value of Internet Protocol (IP).

7. The communication system according to claim 1, wherein the characteristic information represents a length of the frame.

8. The communication system according to claim 1, wherein the characteristic information represents a payload content of the frame.

9. A communication device for relaying a signal between a master device and a slave device to be time-synchronized with each other, the communication device comprising:
information setting circuitry to set, in a frame, characteristic information about priority of the frame, the frame being received from either the master device or the slave device; and
time synchronization management circuitry to store a retention time of a first time-synchronization frame caused to occur during relaying of the first time-synchronization frame, to add the retention time of the first time-synchronization frame being stored to a correction field of a second time-synchronization frame and write the retention time of the first time-synchronization frame being stored into the second time-synchronization frame as a device-specific retention time notification of which is provided to either the slave device or another device connected to the slave device when the second time-synchronization frame is relayed, to store a retention time of a third time-synchronization frame caused to occur during relaying of the third time-synchronization frame, and to add the retention time of the third time-synchronization frame being stored to a correction field of a fourth time-synchronization frame and write the retention time of the third time-synchronization frame being stored into the fourth time-synchronization frame as a device-specific retention time notification of which is provided to either the slave device or another device connected to the slave device when the fourth time-synchronization frame is relayed, the first time-synchronization frame being a frame sent from the master device to the slave device, the second time-synchronization frame being a frame sent from the master device to the slave device, the third time-synchronization frame being a frame sent from the slave device to the master device, the fourth time-synchronization frame being a frame sent from the master device to the slave device.

10. The communication device according to claim 9, wherein
the information setting circuitry sets the characteristic information in a tag added to the frame received from either the master device or the slave device.

11. The communication device according to claim 9, wherein
the information setting circuitry adds a tag in which the characteristic information is set, to the frame received from either the master device or the slave device, and removes the tag from a frame to be sent to either the master device or the slave device.

12. The communication device according to claim 11, comprising:
transmission delay time aggregation circuitry to associate a value in the correction field of a frame to be sent to either the master device or the slave device, with the characteristic information, and to store the value and the characteristic information in association.

13. The communication device according to claim 9, wherein the characteristic information represents a priority level of a frame.

14. The communication device according to claim 13, wherein the priority level is a priority code point (PCP) value in a virtual local area network (VLAN) tag.

15. The communication device according to claim 13, wherein the priority level is a type of service (ToS) value of Internet Protocol (IP).

16. The communication device according to claim 9, wherein the characteristic information represents a length of the frame.

17. The communication device according to claim 9, wherein the characteristic information represents a payload content of the frame.

18. A communication method for use in a communication device for relaying a signal between a master device and a slave device to be time-synchronized with each other, the communication method comprising:
setting, in a frame, characteristic information about priority of the frame, the frame being received from either the master device or the slave device;
storing a retention time of a first time-synchronization frame caused to occur during relaying of the first time-synchronization frame, the first time-synchronization frame being a frame sent from the master device to the slave device;
adding the retention time of the first time-synchronization frame being stored to a correction field of a second time-synchronization frame and writing the retention time of the first time-synchronization frame being stored into the second time-synchronization frame as a device-specific retention time notification of which is provided to either the slave device or another device connected to the slave device when the second time-synchronization frame is relayed, the second time-synchronization frame being a frame sent from the master device to the slave device;
storing a retention time of a third time-synchronization frame caused to occur during relaying of the third time-synchronization frame, the third time-synchronization frame being a frame sent from the slave device to the master device; and
adding the retention time of the third time-synchronization frame being stored to a correction field of a fourth time-synchronization frame and writing the retention time of the third time-synchronization frame being stored into the fourth time-synchronization frame as a device-specific retention time notification of which is provided to either the slave device or another device connected to the slave device when the fourth time-synchronization frame is relayed, the fourth time-synchronization frame being a frame sent from the master device to the slave device.

19. A control circuit for controlling a communication device that relays a signal between a master device and a slave device to be time-synchronized with each other, the control circuit causing the communication device to perform:
setting, in a frame, characteristic information about priority of the frame, the frame being received from either the master device or the slave device;
storing a retention time of a first time-synchronization frame caused to occur during relaying of the first time-synchronization frame, the first time-synchronization frame being a frame sent from the master device to the slave device;
adding the retention time of the first time-synchronization frame being stored to a correction field of a second time-synchronization frame and writing the retention time of the first time-synchronization frame being stored into the second time-synchronization frame as a device-specific retention time notification of which is provided to either the slave device or another device connected to the slave device when the second time-synchronization frame is relayed, the second time-synchronization frame being a frame sent from the master device to the slave device;
storing a retention time of a third time-synchronization frame caused to occur during relaying of the third time-synchronization frame, the third time-synchronization frame being a frame sent from the slave device to the master device; and
adding the retention time of the third time-synchronization frame being stored to a correction field of a fourth time-synchronization frame and writing the retention time of the third time-synchronization frame being stored into the fourth time-synchronization frame as a device-specific retention time notification of which is provided to either the slave device or another device connected to the slave device when the fourth time-synchronization frame is relayed, the fourth time-synchronization frame being a frame sent from the master device to the slave device.

20. A non-transitory storage medium storing a program for controlling a communication device that relays a signal between a master device and a slave device to be time-synchronized with each other,
the program causing the communication device to perform:

setting, in a frame, characteristic information about priority of the frame, the frame being received from either the master device or the slave device;

storing a retention time of a first time-synchronization frame caused to occur during relaying of the first time-synchronization frame, the first time-synchronization frame being a frame sent from the master device to the slave device;

adding the retention time of the first time-synchronization frame being stored to a correction field of a second time-synchronization frame and writing the retention time of the first time-synchronization frame being stored into the second time-synchronization frame as a device-specific retention time notification of which is provided to either the slave device or another device connected to the slave device when the second time-synchronization frame is relayed, the second time-synchronization frame being a frame sent from the master device to the slave device;

storing a retention time of a third time-synchronization frame caused to occur during relaying of the third time-synchronization frame, the third time-synchronization frame being a frame sent from the slave device to the master device; and adding the retention time of the third time-synchronization frame being stored to a correction field of a fourth time-synchronization frame and writing the retention time of the third time-synchronization frame being stored into the fourth time-synchronization frame as a device-specific retention time notification of which is provided to either the slave device or another device connected to the slave device when the fourth time-synchronization frame is relayed, the fourth time-synchronization frame being a frame sent from the master device to the slave device.

* * * * *